United States Patent
Monroy-Hernández et al.

(10) Patent No.: US 12,495,279 B2
(45) Date of Patent: *Dec. 9, 2025

(54) NON-TEXTUAL COMMUNICATION AND USER STATES MANAGEMENT

(71) Applicant: Snap Inc., Santa Monica, CA (US)

(72) Inventors: Andrés Monroy-Hernández, Seattle, WA (US); Chunjong Park, Seattle, WA (US); Fannie Liu, Seattle, WA (US); Yu Jiang Tham, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 18/475,921

(22) Filed: Sep. 27, 2023

(65) Prior Publication Data
US 2024/0031782 A1    Jan. 25, 2024

Related U.S. Application Data

(63) Continuation of application No. 16/948,185, filed on Sep. 8, 2020, now Pat. No. 11,812,347.
(Continued)

(51) Int. Cl.
*H04W 4/38* (2018.01)
*H04M 1/7243* (2021.01)
*H04W 4/21* (2018.01)

(52) U.S. Cl.
CPC .......... *H04W 4/21* (2018.02); *H04M 1/7243* (2021.01); *H04W 4/38* (2018.02)

(58) Field of Classification Search
CPC .......... H04W 4/21; H04W 4/38; H04W 4/02; H04W 4/12; H04M 1/7243; H04M 1/72454; H04L 67/131; H04L 67/30
See application file for complete search history.

(56) References Cited

U.S. PATENT DOCUMENTS

| | | | |
|---|---|---|---|
| 5,754,939 A | 5/1998 | Herz et al. | |
| 6,038,295 A | 3/2000 | Mattes | |

(Continued)

FOREIGN PATENT DOCUMENTS

| | | |
|---|---|---|
| CA | 2887596 A1 | 7/2015 |
| WO | WO-2012000107 A1 | 1/2012 |

(Continued)

OTHER PUBLICATIONS

"U.S. Appl. No. 16/948,185, Examiner Interview Summary mailed Feb. 22, 2023", 2 pgs.

(Continued)

*Primary Examiner* — Marcos L Torres
(74) *Attorney, Agent, or Firm* — Schwegman Lundberg & Woessner, P.A.

(57) ABSTRACT

A method and a system include receiving a first signal value generated by a biosignal sensor coupled to the first client device, receiving one or more second signal values corresponding to a respective sensor reading or environmental condition associated with the first client device, determining a total score based on a first score and one or more second scores determined based on the first and the one or more second signal values, selecting a first state of the plurality of states based on a ranking of total scores of the plurality of states, and causing a display of a first notification associated with a first user-selectable element corresponding to the first state on the first client device.

20 Claims, 17 Drawing Sheets

Related U.S. Application Data

(60) Provisional application No. 62/896,981, filed on Sep. 6, 2019.

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0099445 A1* | 4/2010 | Song ............... H04M 1/0214 455/566 |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0300847 A1 | 12/2011 | Quy |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0221866 A1 | 8/2014 | Quy |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0234572 A1 | 8/2016 | Dixit |
| 2016/0277419 A1 | 9/2016 | Allen et al. |
| 2016/0321708 A1 | 11/2016 | Sehn |
| 2016/0359957 A1 | 12/2016 | Laliberte |

(56) References Cited

U.S. PATENT DOCUMENTS

| | | |
|---|---|---|
| 2016/0359987 A1 | 12/2016 | Laliberte |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0374003 A1 | 12/2017 | Allen et al. |
| 2017/0374508 A1 | 12/2017 | Davis et al. |
| 2018/0069817 A1 | 3/2018 | Constantinides |
| 2019/0050774 A1 | 2/2019 | Divine et al. |
| 2020/0004404 A1 | 1/2020 | Mercs |
| 2021/0076173 A1 | 3/2021 | Monroy-Hernandez et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 16/948,185, Examiner Interview Summary mailed Aug. 24, 2022", 2 pgs.

"U.S. Appl. No. 16/948,185, Final Office Action mailed May 20, 2022", 18 pgs.

"U.S. Appl. No. 16/948,185, Final Office Action mailed Dec. 12, 2022", 19 pgs.

"U.S. Appl. No. 16/948,185, Non Final Office Action mailed Aug. 30, 2022", 18 pgs.

"U.S. Appl. No. 16/948,185, Non Final Office Action mailed Sep. 17, 2021", 20 pgs.

"U.S. Appl. No. 16/948,185, Notice of Allowance mailed Mar. 8, 2023", 9 pgs.

"U.S. Appl. No. 16/948,185, Notice of Allowance mailed Jun. 28, 2023", 8 pgs.

"U.S. Appl. No. 16/948,185, Response filed Feb. 23, 2023 to Final Office Action mailed Dec. 12, 2022", 11 pgs.

"U.S. Appl. No. 16/948,185, Response filed Aug. 22, 2022 to Final Office Action mailed May 20, 2022", 11 pgs.

"U.S. Appl. No. 16/948,185, Response filed Nov. 29, 2022 to Non Final Office Action mailed Aug. 30, 2022", 12 pgs.

"U.S. Appl. No. 16/948,185, Response filed Dec. 17, 2021 to Non Final Office Action mailed Sep. 17, 2021", 13 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible for", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

Bales, Elizabeth, et al., "CoupleVIBE: Mobile Implicit Communication to Improve Awareness for (Long-Distance) Couples", CSCW'11: Proceedings of the ACM 2011 conference on Computer supported cooperative work, pp. 65-74, (2011), 10 pgs.

Bente, Gary, et al., "Avatar-Mediated Networking: Increasing Social Presence and Interpersonal Trust in Net-Based Collaborations", Human communication research, 34(2), (2008), 287-318.

Bentley, Frank, et al., "The Use of Mobile Social Presence", IEEE Pervasive Computing, vol. 8, Iss. 4, (2009), 35-41.

Biocca, Frank, et al., "Toward a More Robust Theory and Measure of Social Presence: Review and Suggested Criteria", Presence, vol. 12, No. 5, (456-480), 2003.

Chang, Angela, et al., "LumiTouch: An Emotional Communication Device", CHI EA '01: CHI '01 Extended Abstracts on Human Factors in Computing Systems, pp. 313-314, (2001), 12 pgs.

Dey, Anind K, et al., "From Awareness to Connectedness: The Design and Deployment of Presence Displays", CHI '06: Proceedings of the SIGCHI Conference on Human Factors in Computing Systems, (2006), 899-908.

Eichhorn, Elisabeth, et al., "A stroking device for spatially separated couples", MobileHCI '08: Proceedings of the 10th international conference on Human computer interaction with mobile devices and services, pp. 303-306, (2008), 4 pgs.

Griggio, Carla F, et al., "Augmenting Couples' Communication with Lifelines: Shared Timelines of Mixed Contextual Information", CHI '19: Proceedings of the 2019 CHI Conference on Human Factors in Computing Systems, Paper No. 623, (2019), 1-13.

Gunawardena, Charlotte N, et al., "Social Presence Theory and Implications for Interaction and Collaborative Learning in Computer Conferences", International Jl. of Educational Telecommunications (1995) 1(2/3), 147-166, (1995), 20 pgs.

Ho, Joyce, et al., "Using Context-Aware Computing to Reduce the Perceived Burden of Interruptions from Mobile Devices", CHI '05: Proceedings of the SIGCHI Conference on Human Factors in Computing Systems, (2005), 909-918.

Hsieh, Sara H, et al., "Playfulness in mobile instant messaging", Computers in Human Behavior, vol. 69, (2017), 405-414.

Ijsselsteijn, Wijnand, et al., "Staying in Touch Social Presence and Connectedness through Synchronous and Asynchronous Communication Media", Human-computer interaction: Theory and practice (Part II), 2(924), e928, (2003), 5 pgs.

Iqbal, Shamsi T, et al., "Effects of Intelligent Notification Management on Users and Their Tasks", CHI '08: Proceedings of the SIGCHI Conference on Human Factors in Computing Systems, (2008), 93-102.

Kaye, Joseph, et al., "Communicating intimacy one bit at a time", CHI EA '05: CHI '05 Extended Abstracts on Human Factors in Computing Systems, (2005), 1529-1532.

Kowalski, Robert, et al., "cubble: A Multi-Device Hybrid Approach Supporting Communication in Long-Distance Relationships", TEI '13: Proceedings of the 7th International Conference on Tangible, Embedded and Embodied Interaction, pp. 201-204, (2013), 4 pgs.

Liu, Fannie, et al., "Supporting Social Interactions with an Expressive Heart Rate Sharing Application", Proceedings of the ACM on Interactive, Mobile, Wearable and Ubiquitous Technologies, vol. 1, Iss. 3, Art. No. 77, (2017), 1-26.

Lottridge, Danielle, et al., "Sharing Empty Moments: Design for Remote Couples", CHI '09: Proceedings of the SIGCHI Conference on Human Factors in Computing Systems, pp., (2009), 2329-2338.

Park, Chunjong, et al., "Don't Bother Me. I'm Socializing!': A Breakpoint-Based Smartphone Notification System", CSCW '17: Proceedings of the 2017 ACM Conference on Computer Supported Cooperative Work and Social Computing, (2017), 541-554.

* cited by examiner

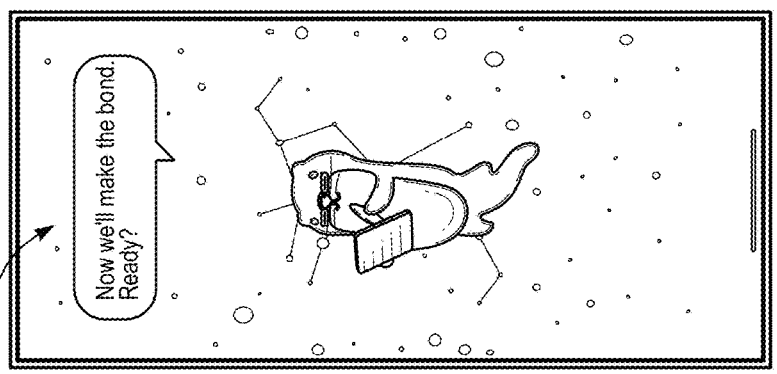
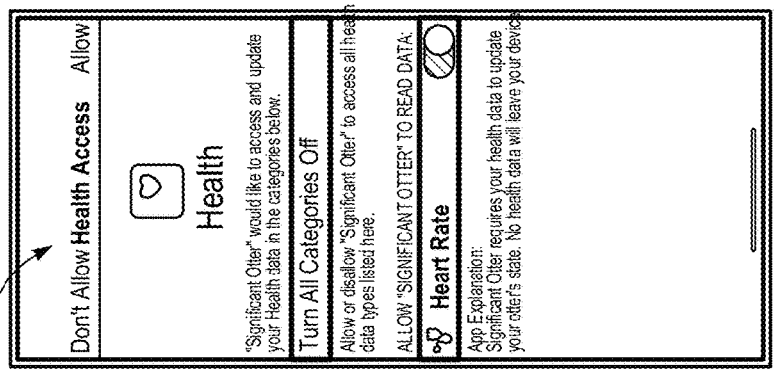
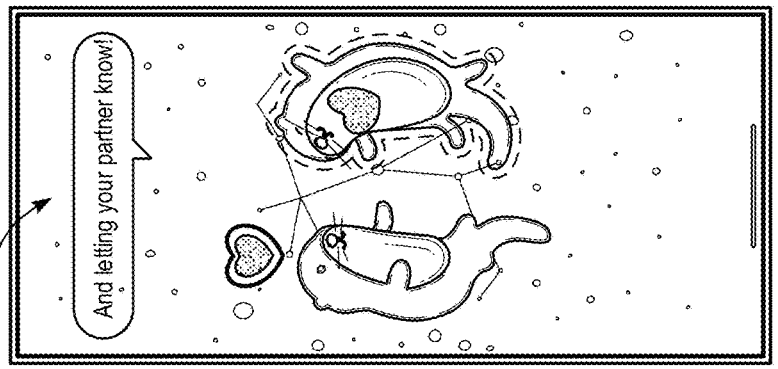
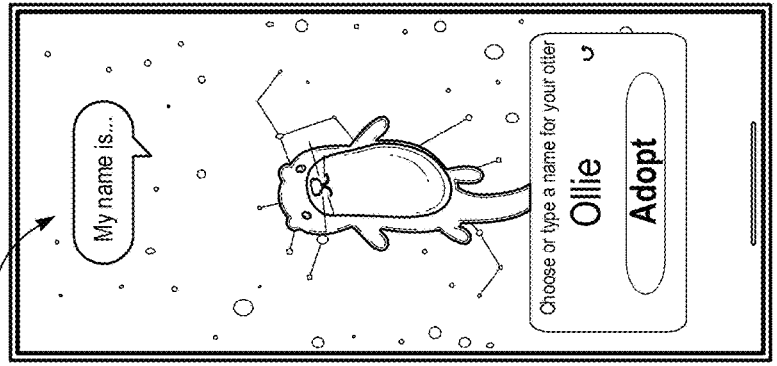
FIG. 7

1400

Example States & Scores

| | Happy | Sad | At Home | Running | ... |
|---|---|---|---|---|---|
| Onboard Sensors | | | | | |
| Heart Rate | 0.5 | 0.1 | 0.1 | 0.4 | |
| Activity Recognition (Walking, Running, etc) | 0 | 0 | 0.2 | 0.7 | |
| Magnetometer (Compass) | 0 | 0 | 0 | 0 | |
| IMU (Motion) | 0.2 | 0.1 | 0 | 0.3 | |
| Location | 0 | 0 | 0.6 | 0 | |
| Collocation | 0 | 0 | 0 | 0 | |
| Skin Conductance | 0 | 0 | 0 | 0.2 | |
| Sound | 0.05 | 0 | 0 | 0.15 | |
| Sensors from Paired Hardware (Glasses) | 0 | 0.1 | 0 | 0 | |
| Environmental Conditions | | | | | |
| Ambient Temperature | 0 | 0.2 | 0 | 0 | |
| Humidity | 0 | 0 | 0 | 0 | |
| Pollution | 0 | 0.05 | 0 | 0 | |
| Weather Conditions (Raining, Sunny, Cloudy, etc) | 0.1 | 0 | 0 | 0.05 | |
| UV Index | 0 | 0 | 0 | 0 | |
| Nearby Businesses | 0 | 0 | 0.2 | 0 | |
| Total Score | 0.85 | 0.55 | 1.1 | 1.8 | |

*FIG. 14*

NON-TEXTUAL COMMUNICATION AND USER STATES MANAGEMENT

RELATED APPLICATIONS

This application is a continuation of U.S. patent application Ser. No. 16/948,185, filed Sep. 8, 2020, which claims the priority benefit of U.S. Provisional Application Ser. No. 62/896,981, filed Sep. 6, 2019, each of which is hereby incorporated by reference in its entirety.

TECHNICAL FIELD

The present disclosure generally relates to social network systems that manage user signal data generated by sensors to detect user states and interact with other users via user notifications.

BACKGROUND

Mobile devices allow users to communicate with each other in many ways, such as phone calls and text messages. For users who hope to cultivate and strengthen personal relationships with others when they are physically apart, one issue with communication via text messages is that the text messages are oftentimes overly brief and inauthentic. Even if users choose to spend time to craft thoughtful messages, they may still not able to reach the desired depth of communication and closeness as intended. In addition, too many or lengthy text messages may oftentimes overwhelm the users to which the messages are directed, negatively affecting user experience.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 7 shows user interfaces for configuring user preferences of the user state system according to an embodiment.

FIG. 14 shows a block diagram of scores determined for user states according to an embodiment.

DETAILED DESCRIPTION

Figure 1:
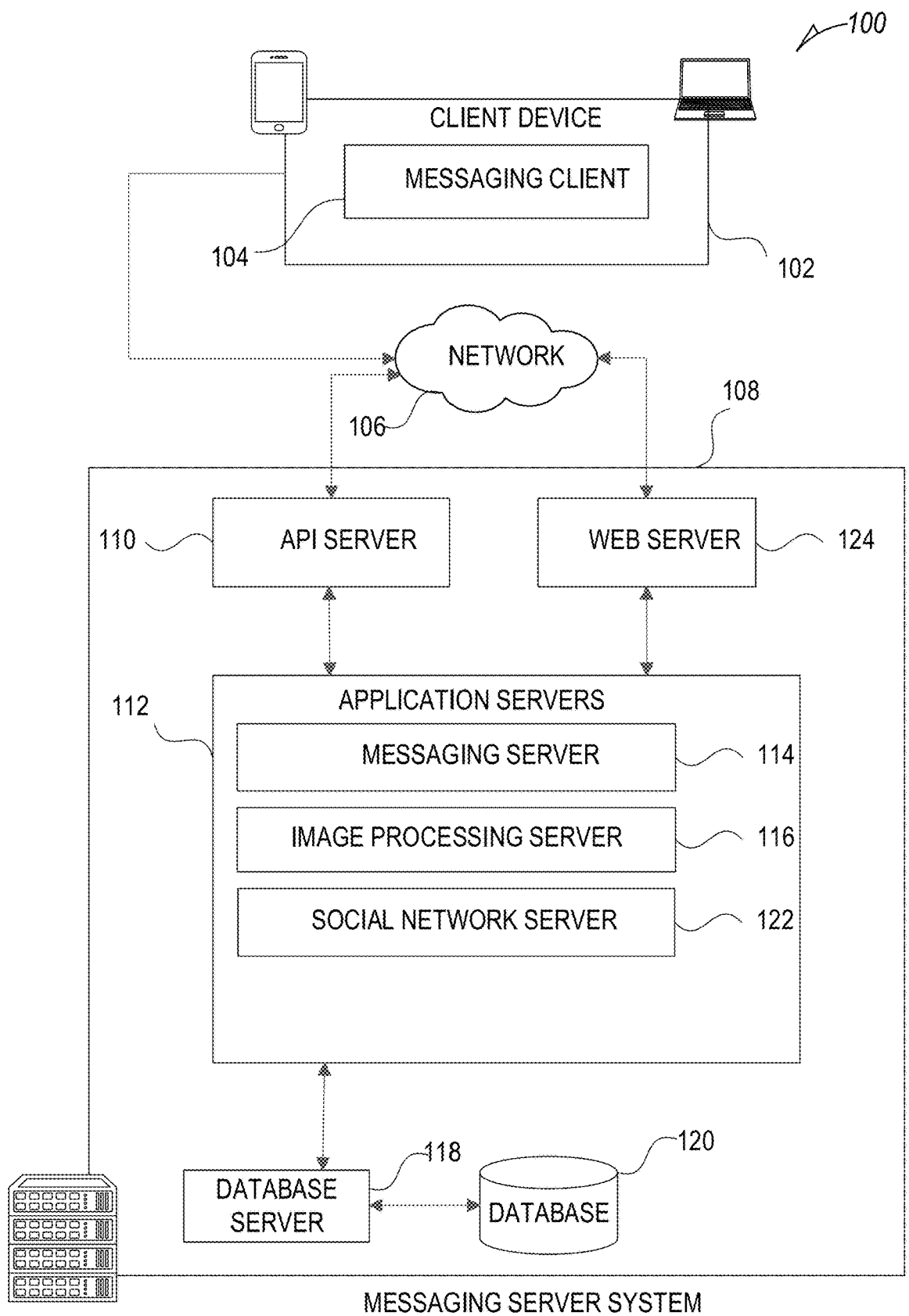
FIG. 1 is a diagrammatic representation of a networked environment in which the present disclosure may be deployed, in accordance with an embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments of the present disclosure improve the functionality of electronic messaging software and systems by recognizing that users may want to keep other connected users updated about their emotional, physical activity and mental state, so that it helps to maintain the closeness between them and strengthen their relationships even when they are physically apart. To this end, the embodiments of the present disclosure manage user interactions based on non-textual mood-centric communication. Specifically, a user state system generates a current state of a user based on user signal data. The user signal data includes biosignal data (e.g., first signal values) and circumstantial data (e.g., second signal values) associated with the user. The user state system receives data collected by biosignal sensors, including heart rate data and skin conductance data. The user state system also receives circumstantial data, including sensor-based data, such as physical activity data, location data, UV index data, light exposure data, and surrounding sound data, and non-sensor based data, such as time data, weather data (e.g., temperature, humidity, pollution, pollen count), traffic data, and nearby businesses data, etc.

In one embodiment, the user state system may analyze the biosignal data in conjunction with circumstantial data to determine a total score associated with each user state. The total scores are determined based on inferred scores that are based on the data history of the user collected in a predetermined time period, such as a month or a year. The user state system may rank the total scores and determine the state corresponding to the highest score as the current state (e.g., a first state) of the user.

In one embodiment, the user state system determines arousal level based on heart rate data, and generates emotion status (e.g., positive emotion or negative emotion) based on the determined arousal level. The user state system may assign a first score to each state based on the emotion status and arousal level. The user state system assigns one or more second scores to each state based on the circumstantial data. Certain circumstantial data weighs in a positive state (e.g., happy state) and some circumstantial data weighs in a negative state of a user. For example, if weather data indicates today is sunny, the state system may assign a score (e.g., 0.1) to the happy state, but may assign a score 0 to sad, at home, or activity state of the user. In another example, if the user state system determines the user is at home, the system may assign a score (e.g., 0.6) to at home state, and may assign a score 0 to happy, sad, or exercising state of the user. The scores are generated based on the data history of the user and may be updated for that particular user over time. The time window of the data history may be a pre-determined time period, such as a month or a year.

In one embodiment, the user state system generates notifications corresponding to the current state. The notification is accompanied by a haptic pattern, such as a low-intensity vibration on the client device. The client device may be a mobile device or a wearable device, such a smartwatch. The intensity of the vibration is adjustable by the user via the user state system, such that the intensity may be set to low (e.g., a nudge) compared to the regular vibration generated for a text message or a phone call. The notification may be accompanied by a series of vibration depending on the current state the system has determined. For example, the haptic pattern may be a single event vibration (e.g., a nudge or a tap) for an at-home state, and may be a multiple events vibration (e.g., buzzing) for an activity state. In one embodiment, to avoid notifications causing too much interruption, the user state system limits the notification frequency with a predefined time interval, which can be also adjusted by users depending on their preference. Different haptic alerts patterns are generated for different types of notifications, including notifications associated with the current state, state changes and reminders. Users may easily distinguish the types of notification and decide whether to check or ignore the notification without having to look at the user interface. The notifications may be ephemeral messages. The length of the ephemeral message may be determined based on the immediacy of the state of the sending user, delivery timing, the types of the client device, etc.

In one embodiment, the user state system may include a background notification scheduler to intelligently manage notification timing depending on the states of the sending and recipient users. For example, the user state system generates notifications when the recipient user is transitioning between states, as users are more likely to process new information with lower cognitive load during the transition of two activities than when they are in the middle of a task. By leveraging sensors coupled to client devices, background notification scheduler tracks a user's state periodically and determines the opportune moment to deliver notifications. The background notification scheduler may reside in the user state system.

Alternatively, the user state system may generate a list of potential user states on the user interface of the client device for user selection. The list of potential user states is based on the determination and ranking of the total scores. Upon receiving the user section of the current state, the user state system may associate the affected states with weight values and update the inferred score associated with respective user states. For example, if a user selected the current state determined by the user state system as the current state of the user, the state system may associate the chosen state with a high weight value in light of the scores assigned to the chosen state. If the user selected a state other than the current state determined by the user state system, the state system may associate the determined current state with a low weight value and associate the selected current state with a high weight value. The weight values may be considered by the system for future determinations of states of the particular user.

In one embodiment, the user state system may identify a current state among a plurality of states, including excited, angry, calm, sad, neutral, exercising, eating, sleeping, shopping, working, walking, running, cycling, automotive, etc. Each state is associated with a state representation of the user, such as an anthropomorphic character (e.g., an otter), or a cartoon avatar version of the user (e.g., Bitmoji) or life-like 3D model of the user's face and body. The state representation is presented by a user interface (UI) element. For example, a UI element may be associated with an image of an otter. The happy face of an otter may represent a happy or excited state of a user. A sad face of the otter may represent a sad state of the user. A sweating otter holding dumbbells may represent an exercising state of the user (e.g., working out at a gym).

In one embodiment, upon sending the notification associated with the current state from a sending user, the user state system may provide a set of predefined options for the recipient user to respond. The predefined options are generated based on the receiver's own current state, and the relationship strength with the sending user. The predefined option may include acknowledgment, disambiguation, and support. Acknowledgment responses are short-form responses that allow users to let the sender know that they received their message. Disambiguation responses allow users to ask for clarification around the meaning of the message. Support responses allow users to provide support back to the sender, such as by conveying sympathy or solidarity. For example, the recipient user may respond to the sender's current state by choosing a UI element that represents support or comforting, such as a media content item showing two otters cuddling. In another example, in response to sad state of a sending user, the system might suggest reacting with a "pat on the back" or a "cheer up" that the recipient user may trigger by tapping on the screen or gesturing with arms or blowing wind onto the client device.

In one embodiment, the user state system may provide a state representation to a user, such that a user may send the state to other users via gestures that convey contextual information. For example, the state representation may be a moving UI element on the touchscreen of a client device (e.g., smartwatch or smartphone). The gestures may be a tap on the touchscreen, or full-body movements (e.g., running). The importance of the message may be indicated by the intensity of the gestures, such as how long a tap gesture is held. The recipient user may similarly provide responses back based on his or her own state representation and gestures performed on the client device.

In one embodiment, the representations of states may include an abstract representation of a user state might rely on simple geometric figures where size, shape, color and motion speed map to the user state, e.g., a fast-moving red circle displayed on a smartwatch screen can map to "anger." In one embodiment, the user state system may also indicate or prompt a change in the perception of the user's environment. For example, a user might send not only an avatar but might also be able to change the recipient user's environment, such as changing the way the sky or the floor look through the recipient user's live video camera, or even connect to the Internet of Things (IoT) devices to change the actual room lighting, temperature or motion of objects of the recipient user's environment.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity. The client device 102 may be a mobile device or a wearable device, such a smartwatch, a pair of smart glasses, or any device communicatively coupled to biosignal sensors and other sensors to monitor user signal data.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
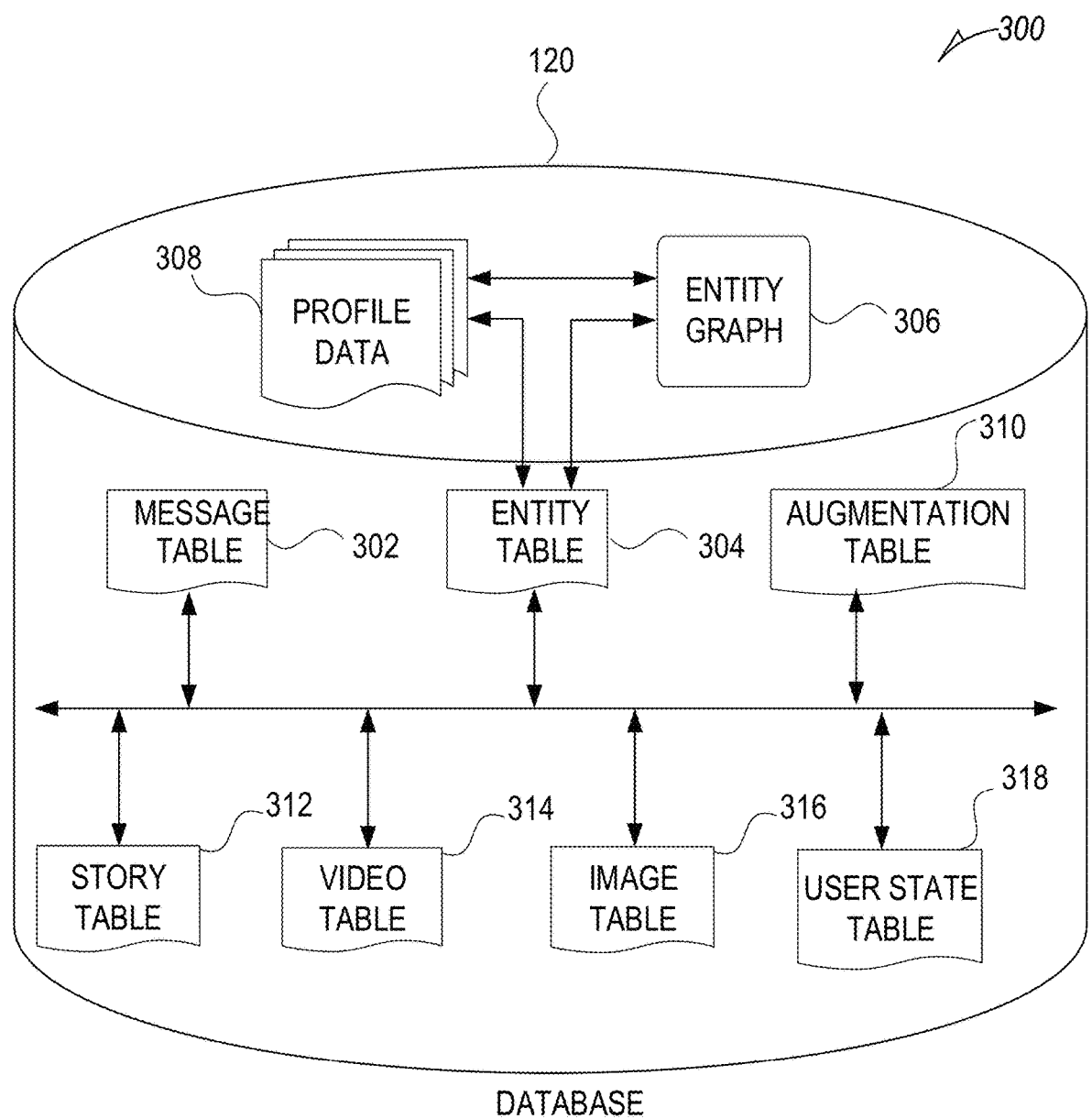
FIG. 3 is a diagrammatic representation of a data structure as maintained in a database, in accordance with an embodiment.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
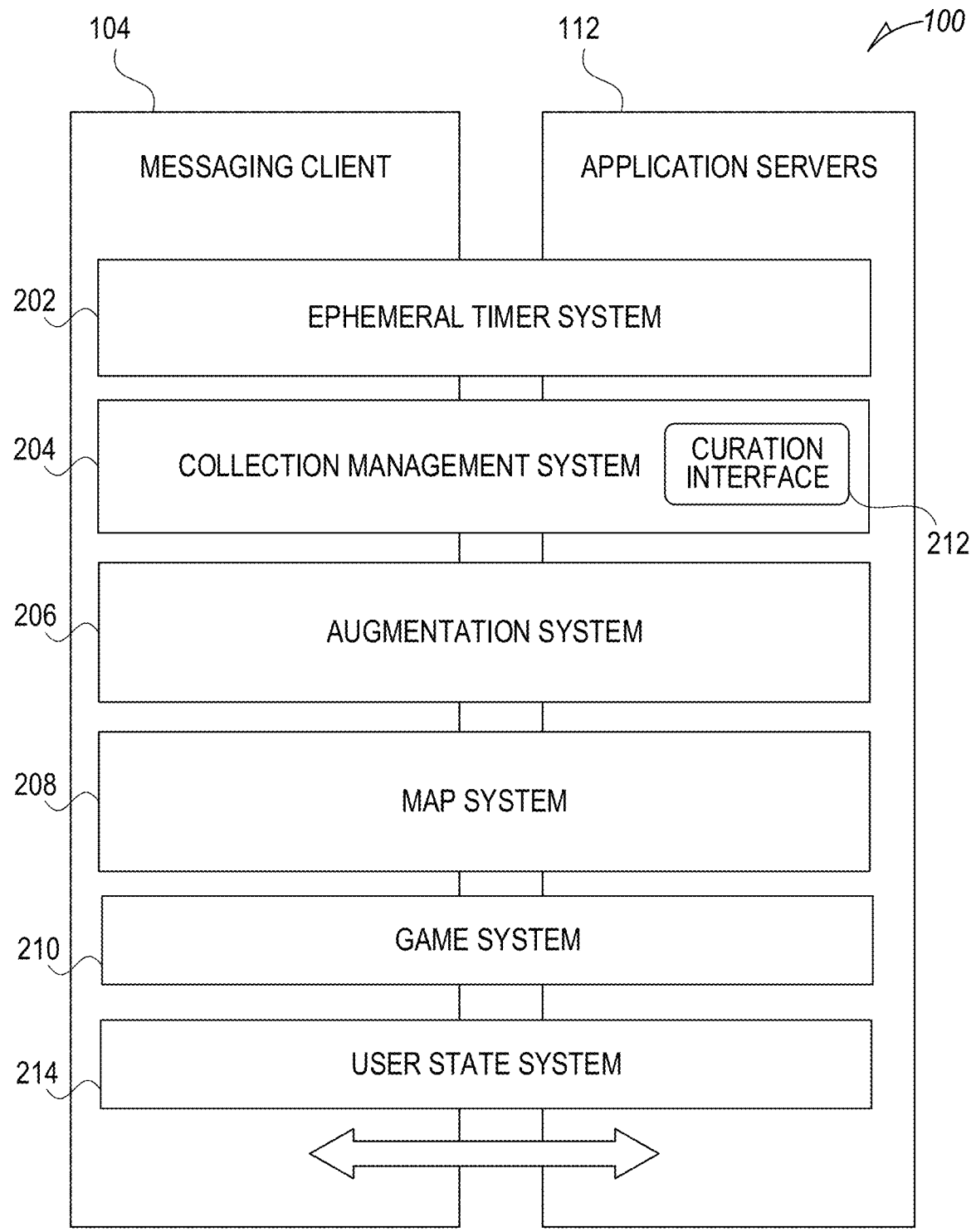
FIG. 2 is a diagrammatic representation of a messaging system, in accordance with an embodiment, that has both client-side and server-side functionality.

FIG. 2 is a block diagram illustrating further details regarding the messaging system 100, according to an embodiment. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 206, a map system 208, a game system 210, and a user state system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively provide access (e.g., for presentation and display) to messages and associated content via the messaging client 104. Further details regarding the operation of the ephemeral timer system 202 are provided below. In one embodiment, the ephemeral time system 202 is responsible for determining the haptic pattern of the notifications corresponding to the states of users, and the time duration of display of the notifications on the user interface of the client device 102. The time duration of the display or the types of the haptic pattern may be determined based on the immediacy of the state of the sending user, the current state of the recipient user, the delivery timing, the types of the client device, etc. Both of the time duration and the haptic pattern may be adjusted via the client device 102 based on user preferences.

Figure 9:
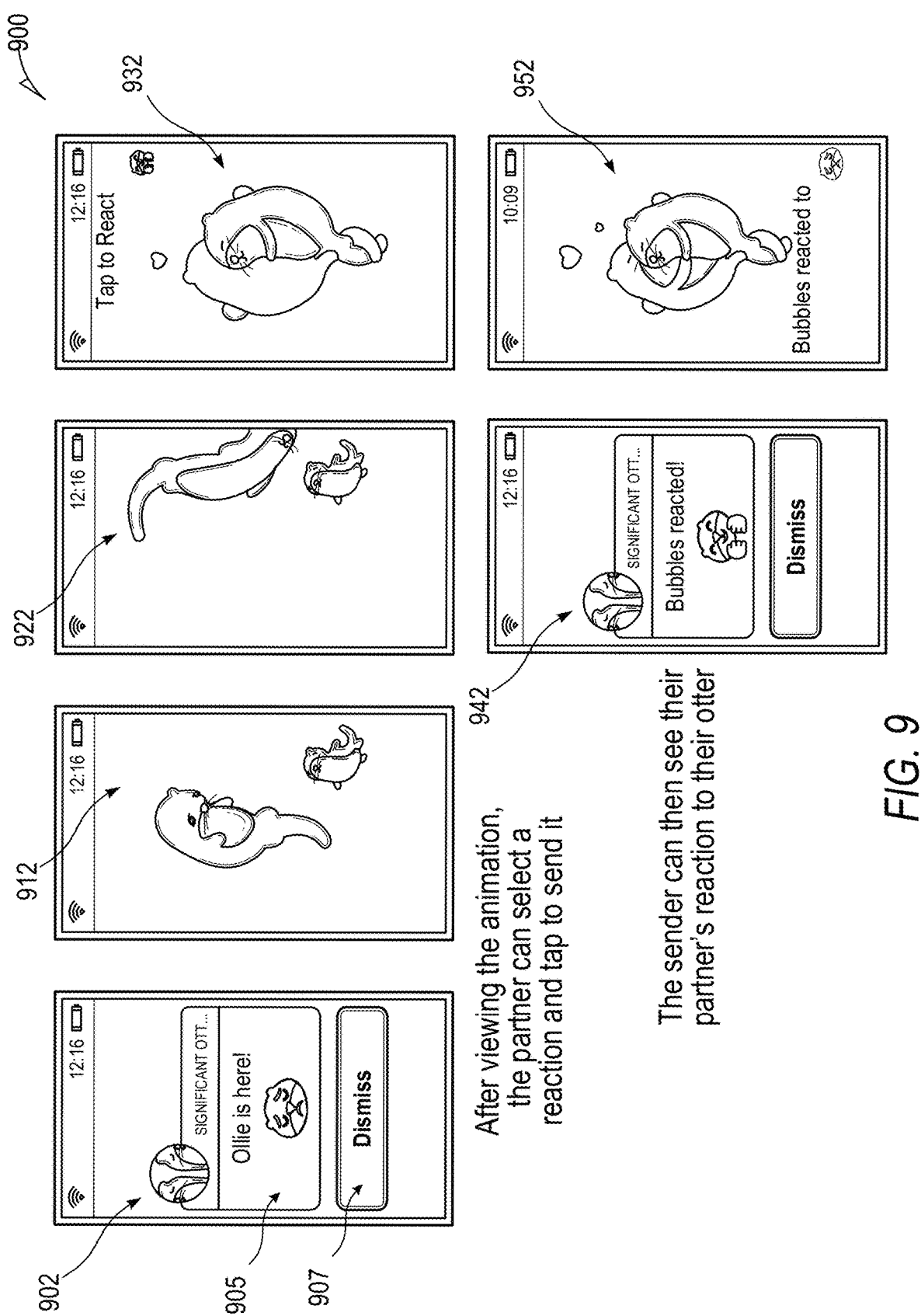
FIG. 9 shows a notification sequence in different user interfaces according to an embodiment.
Figure 10:
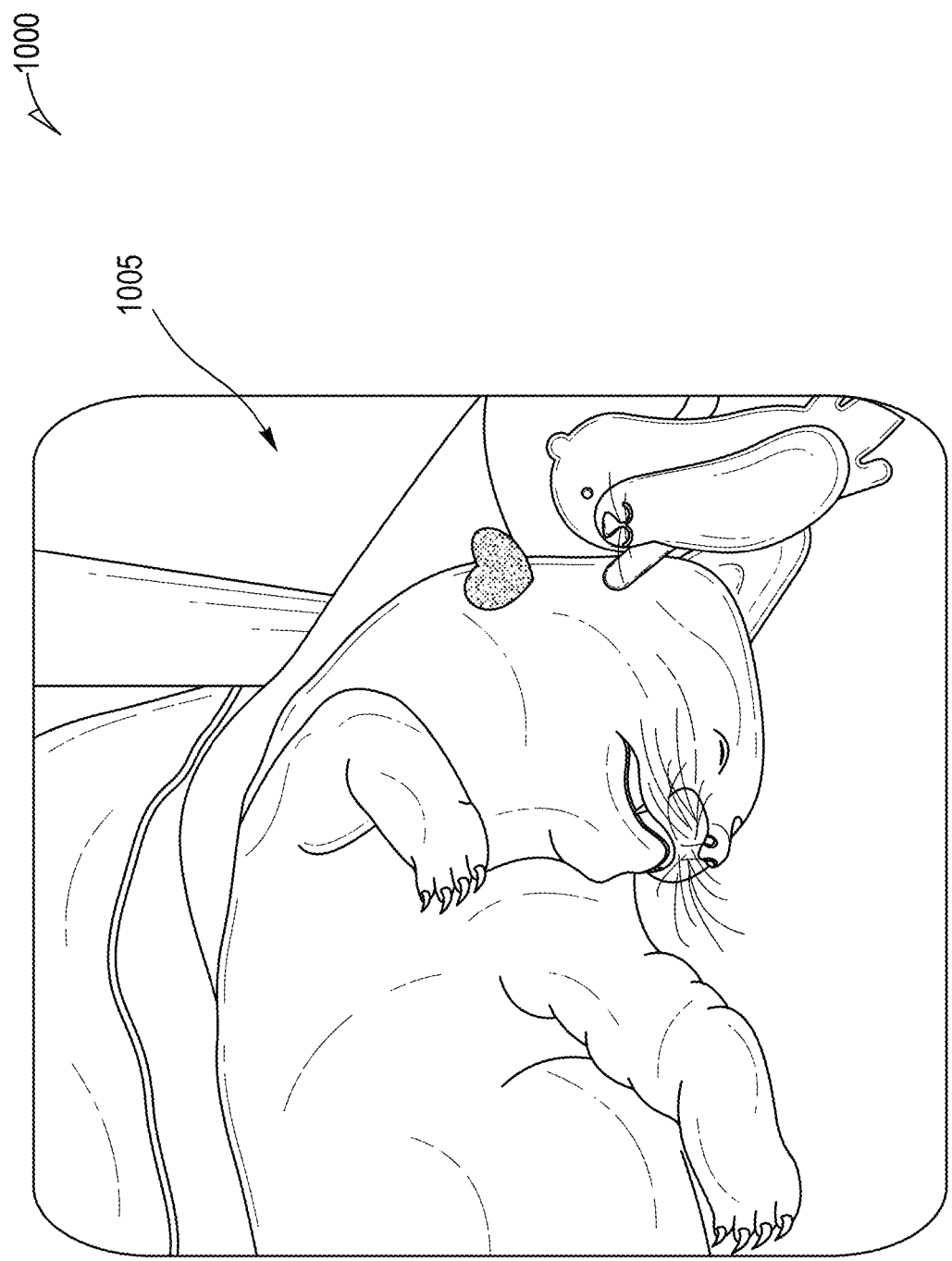
FIG. 10 shows a reaction associated with a media content item to a current state, according to an embodiment.

The collection management system 204 is responsible for managing sets or collections of media (e.g., collections of text, image video, and audio data). A collection of media content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104. In one embodiment, the collection management system 204 is responsible for managing a collection of media content items (e.g., first and second media content items as described herein) that are associated with user states and reactions to the user states of sending users. For example, the collection management system 204 manages media content items as shown in user interfaces 912, 922, 932, 952 as shown in FIG. 9, and media content item as shown in FIG. 10.

The collection management system 204 furthermore includes a curation interface 212 that allows a collection manager to manage and curate a particular collection of content. For example, the curation interface 212 provides an event organizer to curate a collection of content relating to a specific event (e.g., delete inappropriate content or redundant messages). Additionally, the collection management system 204 employs machine vision (or image recognition technology) and content rules to automatically curate a content collection. In one embodiment, compensation may be paid to a user for the inclusion of user-generated content into a collection. In such cases, the collection management system 204 operates to automatically make payments to such users for the use of their content.

The augmentation system 206 provides various functions that allow a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one embodiment, the augmentation system 206 provides a user-based publication platform that allows users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In one embodiment, the augmentation system 206 provides a merchant-based publication platform that allows merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 provides the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further allows a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The user state system 214 is responsible for receiving and managing user signal data of a sending user. The user signal data includes biosignal data, such as heart rate data and skin conductance data. The biosignal data corresponds to a first signal value. The user signal data also includes non-biosignal data, such as physical activity data, location data, UV index data, light exposure data, and surrounding sound data, and non-sensor based data, such as time data, weather data (e.g., temperature, humidity, pollution, pollen count), traffic data, and nearby businesses data, etc. The plurality of data corresponds to one or more second signal values. The user signal data may be stored in the user state table 318. The user state system 214 is responsible for determining scores assigned to each state based on the user signal data. For example, the user state system 214 determines an arousal level and emotion status based on heart rate data of the sending user. For each state of the plurality of states associated with the sending user, the user state system 214 determines a first score based on the heart rate data. The user state system 214 determines one or more second scores based on the non-biosignal data, and determines a current state with the highest total score based on the ranking of the scores among the plurality of user states, and sending a notification associated with the current state of a sending user.

In one embodiment, the user state system 214 is also responsible for causing a display of a notification associated with the current state of the user for selection. Depending on the selection of the state, the user state system 214 assigns weights to the scores of the states. For example, if the sending user selected the current state determined by the user state system, the system assigns a higher weight to the scores that is assigned to the current state. If the sending user selected a state other than the current state determined by the user state system, the system assigns a lower weight to the scores that is assigned to the generated current state. Therefore, the scores are updated and customized for a user over time, that the user state system 214 may accurately determine the current state of the user.

Data Architecture

FIG. 3 is a schematic diagram illustrating data structures 300, which may be stored in the database 120 of the messaging server system 108, according to an embodiment. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications.

This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, provide multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In one embodiment, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In one embodiment, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one embodiment, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In one embodiment of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In one embodiment, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In one embodiment, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In one embodiment, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been programmed to execute efficiently on the client device 102.

In one embodiment, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to provide such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to allow a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which allows a user whose client device 102 is located within a specific geographic location (e.g., on a college or university campus) to contribute to a particular collection. In one embodiment, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

In one embodiment, the database 120 may also store user state table 318. The user state table 318 stores user biosignal data, such as heart rate data and skin conductance data, and non-biosignal data, such as physical activity data, location data, UV index data, light exposure data, and surrounding sound data, and non-sensor based data, such as time data, weather data (e.g., temperature, humidity, pollution, pollen count), traffic data, and nearby businesses data, etc. Each user signal data corresponding to a signal value as being stored in the user state table 318.

Data Communications Architecture

Figure 4:
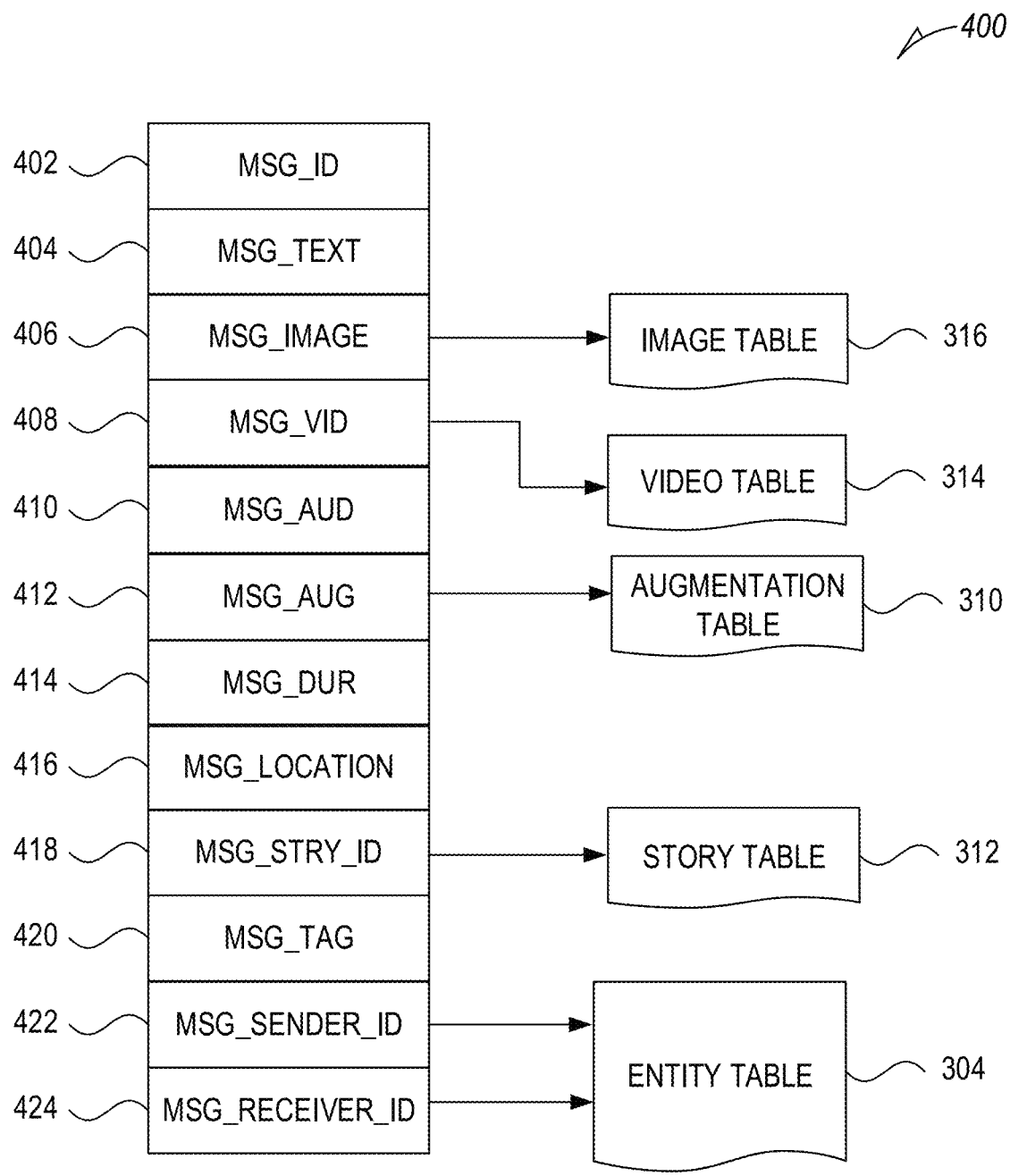
FIG. 4 is a diagrammatic representation of a message, in accordance with an embodiment.

FIG. 4 is a schematic diagram illustrating a structure of a message 400, according to an embodiment, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Non-Textual Communication and User States Management

In one embodiment, the user state system 214 may determine a current state of a sending user by determining scores assigned to each state based on user signal data. The user state system 214 may cause a display of notification on the client device of the sending user for selection. Based on the user selection of the state, the user state system 214 causes a display of notification on a client device of a recipient user. The recipient user may select a reaction corresponding to the current state of the sending user to be sent back to the client device of the sending user.

Figure 6:
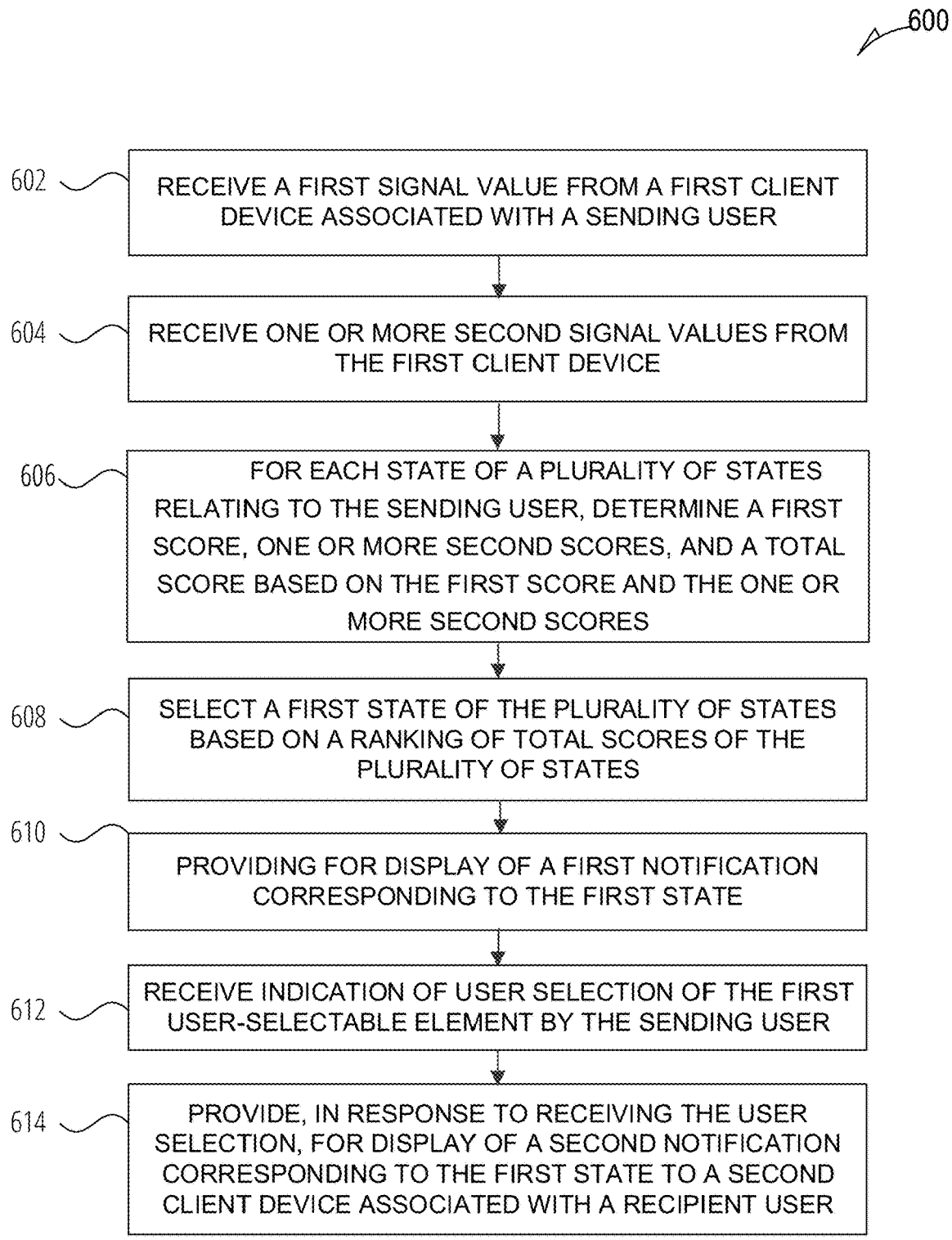
FIG. 6 shows a process for implementing the user state system according to an embodiment.

FIG. 6 shows a process for implementing the user state system according to an embodiment. The operations of process 600 may be performed by any number of different systems, such as the messaging server 114 or the messaging client 104 described herein, or any portion thereof, such as a processor included in any of the systems (e.g., the user state system 214).

At operation 602, the processor receives a first signal value from a first client device 102 associated with a sending user. The first signal value may be generated by a biosignal sensor that is coupled to the first client device 102. In one embodiment, the first signal value is associated with biosignal data of the sending user, such as heart rate data. The heart rate data is real-time data, or is data captured within a window period, such as thirty seconds. This way, the heart rate is accurately assessed to reflect the current state of a user.

At operation 604, the processor receives one or more second signal values from the first client device 102. Each of the one or more second signal values corresponds to a respective sensor reading or environmental condition associated with the first client device 102. The second signal values each corresponds to non-biosignal data or circumstantial data, including sensor-based data, such as physical activity data, location data, UV index data, light exposure data, and surrounding sound data, and non-sensor based data, such as time data, weather data (e.g., temperature, humidity, pollution, pollen count), traffic data, and nearby businesses data, etc.

At operation 606, for each state of a plurality of states relating to the sending user, the processor determines a first score based on the first signal value, determines one or more second scores based on the one or more second signal values, and determines a total score based on the first score and the one or more second scores. In one embodiment, each non-biosignal data corresponding to a second signal value is mapped to each state in the plurality of states, according to a logic system coupled to the user state system. The logic of mapping scores to states of a particular user may be based on general probabilities determined by statistics of all users registered in the messaging server system 108, or it may be customized for individual users based on the user's traits and preferences. For example, when the user state system receives sound data, the system may assign a score 0.05 to happy state, 0.15 to running state, and score 0 to sad and at home states. The user state system infers that a sound is most likely to be associated with the sound of laughing instead of the footsteps during running. In another example, when the user state system receives pollution data, indicating bad air quality. The user state system may assign a score 0.05 to sad state, and score 0 to happy, at home, and running states. For example, a user's emotion may be negatively affected due to the bad air quality. In yet another example, when the user state system receives UV index data, indicating today is a sunny day, the system may assign a score 0.5 to happy state, score 0.3 to running state, and score 0 to sad and at home states. It is because a person is likely to be in a good mood on a sunny day, and is likely to go out for a run. However, the inferred scores may be updated based on personal traits and preferences. Specifically, for a particular user who prefers rainy days over sunny days, the user state system may assign a positive score 0.5 to sad state and score 0 to happy state for this particular user when the UV index data indicates a sunny day.

In one embodiment, the first score based on the first signal value corresponding to heart rate data is determined based on the arousal level and the emotion status. Specifically, the arousal level is determined based on a boundary-setting parameter (e.g., diffNeg) associated with the first signal value of the heart rate. In one embodiment, arousal levels are determined based on the following functions:

NEUTRAL_AROUSAL $0 < hr\_avg - x*diffNeg$;
NEUTRAL_AROUSAL: $hr\_avg - x*diffNeg < hr\_avg + x*diffNeg$;
HIGH_AROUSAL: $hr\_avg + x*diffNeg < 200$ X is a variant based on the first signal value associated with the heart rate data, depending on if the heart rate indicates the user is currently resting or walking.

In one embodiment, the user state system determines emotion status based on the determination of the arousal level. Specifically, when the arousal level is determined to be HIGH, the user state system uses a variant (e.g., valence) to determine if a user is with positive emotion (e.g., feeling excited) or negative emotion (e.g., feeling angry). If valence<0.1, it indicates negative emotion. If 0.1<valence<1, it indicates positive emotion. This way the user state system more frequently surfaces positive emotion than negative emotion for purposes of the user state determination. In one embodiment, In one embodiment, the user state system determines the first score based on at least one of the arousal level or the emotion status.

In one embodiment, the user state system 214 determines a total score assigned to the first signal value and the one or more second signal values associated with each state. As shown in FIG. 14, a total score corresponding to happy state is 0.85, and a total score corresponding to sad state is 0.55.

At operation 608, the processor selects or determines a first state of the plurality of states based on a ranking of total scores of the plurality of states. In one embodiment, the first state is associated with the highest score among all other states. For example, as shown in FIG. 14, the total score of running state is 1.8 that is the highest score among happy, sad, and at home states. Therefore, the user state system 214 may determine running is the current state of the user.

At operation 610, the processor causes or provides for a display of a first notification associated with a first user-selectable element corresponding to the first state on the first client device 102. In one embodiment, the processor causes a display of a notification associated with a selectable-user element representing the current state of the sending user. The user may confirm the current state as the first state determined by the user state system 214, or optionally, select a state other than the first state. The user state system 214 may be associated with the affected states with weight values, and update the scores assigned to the affect states based on the user selection. Specifically, if a particular user selected the current state determined by the user state system as the current state of the user, the system 214 may associate the chosen state with a high weight value. If the user selected a state other than the current state determined by the user state system 214, system 214 may associate the determined current state with a low weight value and associate the selected current state with a high weight value. The weight values may be considered by the system 214 for future determination of states for the particular user. In one embodiment, the first client device 102 causes or provides for display of the first notification of first state on the first client device 102.

At operation 612, the processor receives an indication of a user selection of the first user-selectable element by the sending user. For example, the sending user selected the first state associated with the current state determined by the user state system 214.

At operation 614, in response to receiving the user selection, the processor causes a display of a second notification corresponding to the first state to a second client device 102 associated with a recipient user. For example, as shown in FIG. 9, user interface 902 may be displayed on the second client device 102 of the recipient user. The sending user and recipient use are connected via the user interfaces as shown in FIG. 7. The user interface 902 includes a notification display item 905 (e.g., the second notification) and a selection display item 907. The recipient user is notified by the sending user that he or she is currently sad, as sad state is the current state confirmed by the sending user in accordance with the user selection at operation 612. The otter named Ollie is avatar representing the sending user. The sending user may change it to other names based on personal preferences.

In one embodiment, the recipient user may select the user-selectable display item 905 on the user interface 902 to view a display of a media content item as shown in the user interfaces 912 and 922 in FIG. 9. The media content item (e.g., the first media content item) may be a video or an image and may be associated with the current state of the sending user, such as a video showing a sad otter representing a sad sending user. The recipient user may choose from a plurality of selectable user interface elements (not shown), each of which represents a relevant reaction in response to the current state of the sending user. For example, in response to a sad state of the sending user, the plurality of selectable user interface elements available for recipient user selection may represent comforting, reassurance, cheering up, etc. Each reaction corresponds to a media content item (e.g., the second media content item) to be displayed on the first client device 102 of the sending user.

In one embodiment, upon receiving a selection of a first selectable user interface element representing a reaction the recipient user wishes to send, the processor causes a display of a third notification corresponding to the second media content item on the first client device of the sending user, as shown in user interface 942. User interface 952 shows the second media content item representing the reaction (e.g., comforting) from the recipient user. In one embodiment, the user interface 1000 as shown in FIG. 10 shows another example media content item 1005 representing the comforting reaction from the recipient user.

In one embodiment, the media content item in user interface 1000 may be an augmented reality content item as described above. In the user interface 1000, the media content item 1005 may be a live video generated by the client device of the sending user. In one embodiment, the media content item 1005 may generated based on the heart rate data of the sending user of the media content item 1005, i.e. the recipient user who has received the current state of the sending user. For example, the background of the item 1005 may be modified into a bright red background to represent a good mood of the sending user of item 1005, and a blue background to represent a bad mood of the sending user.

FIG. 7 shows user interfaces for configuring user connection and preferences of the user state system according to an embodiment. In one embodiment, the user state system 214 causes the display of user interfaces 705, 715, 725, and 735 on a client device 102 during the user connection setup process and the user preference setup process. Specifically, a user (e.g., a sending user) may establish a user profile in the messaging server system 108 by naming an avatar, such as an otter named "Ollie" as a representative character of the user. The user may establish a connection (e.g., bonding) with another user (e.g., a recipient user) who is represented by another otter avatar as shown in the user interface 715. A user may grant the user state system 214 permission to access the user's health data as shown in the user interface 725, including the heart rate data. The user profiles may be stored in the entity table 304 in the database 120.

Figure 8:
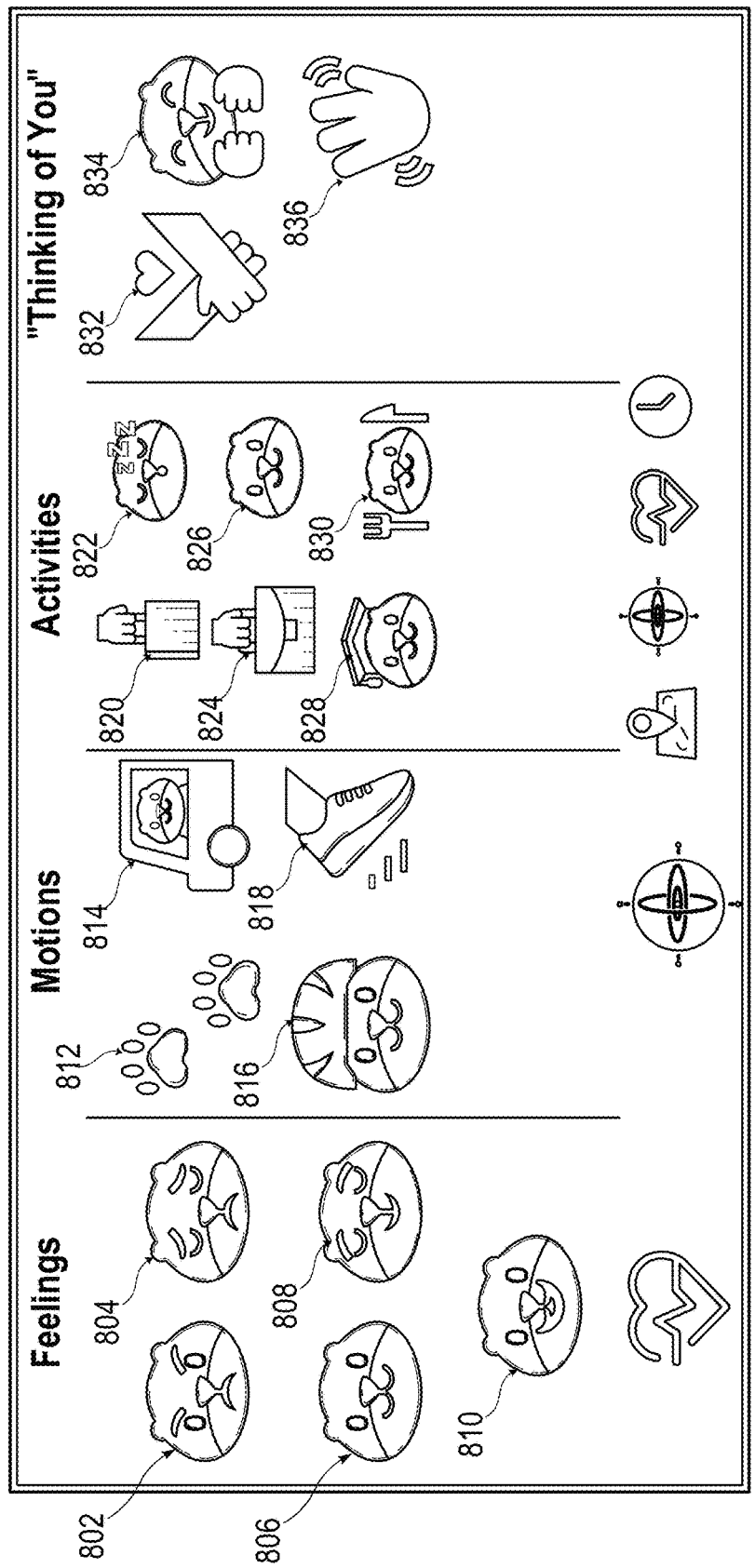
FIG. 8 shows user-selectable elements associated with the types of user states according to an embodiment.

FIG. 8 shows user-selectable elements associated with the types of user states according to an embodiment. In one embodiment, the user state system may cause a display of a plurality of user-selectable elements on a client device 102. Each element corresponds to a state of a user, including excited, angry, calm, sad, neutral, exercising, eating, sleeping, shopping, working, walking, running, cycling, automotive, etc. Each state is associated with a state representation of the user, such as an avatar of the user. The user interface 800 includes a plurality of user-selectable elements corresponding to types of user state. The types of user states may include three categories, i.e., emotional, physical activity and mental states. For example, the "feeling" states as shown may refer to the emotional states, including angry state 802, sad state 804, happy state 806, calm or neutral state 808, and excited state 810. The "motions" and "activities" states may refer to physical activity states, including walking state 812, automotive state 814, cycling state 816, running state 818, shopping state 820, sleeping state 822, working state 824, studying state 828, and eating state 830. The "thinking of you" states as shown may refer to mental states specific to the connected user, including touching, hugging, and waving hands states, represented by elements 832, 834, and 836 respectively. In one embodiment, the states are available to users on the client device 102, that the user may select a state to be sent to a connected user on his or her own initiatives, without having to rely on a pushed notification associated with a system determined current state (e.g., the first state).

In one embodiment, each category of states may be determined based on different types of user signal data. For example, the physical activity states may be determined using biosignal data, such as the heart rate data. The emotional states may be determined based on both biosignal data (e.g., first data values) and non-biosignal data (e.g., one or more second signal values).

FIG. 9 shows a notification sequence in different user interfaces according to an embodiment. The user interface 902 may be displayed on the second client device 102 of the recipient user. The user interface 902 includes a notification display item 905 (e.g., the second notification) and a selection display item 907. In one embodiment, the recipient user may select the user-selectable display item 905 on the user interface 902 to view a display of a media content item as shown in the user interfaces 912 and 922. Upon receiving a user selection of a first selectable user interface element (not shown) representing a reaction the recipient user wishes to send, the processor causes a display of a third notification corresponding to the second media content item on the first client device of the sending user, as shown in user interface 942. User interface 952 shows the second media content item representing the reaction (e.g., comforting) from the recipient user.

FIG. 10 shows a reaction associated with a media content item to a current state, according to an embodiment. The user interface 1000 shows an example media content item 1005. The media content item 1005 may be an image, or a video representing the comforting reaction from the recipient user. In one embodiment, the media content item 1005 may be a live video generated by the client device of the sending user. In one embodiment, the media content item 1005 may be generated based on the heart rate data of the sending user of the media content item 1005, i.e. the recipient user who has received the current state of the sending user. For example, the background of the item 1005 may be modified into a bright red background to represent a good mood of the sending user of item 1005, and a blue background to represent a bad mood of the sending user.

Figure 11:
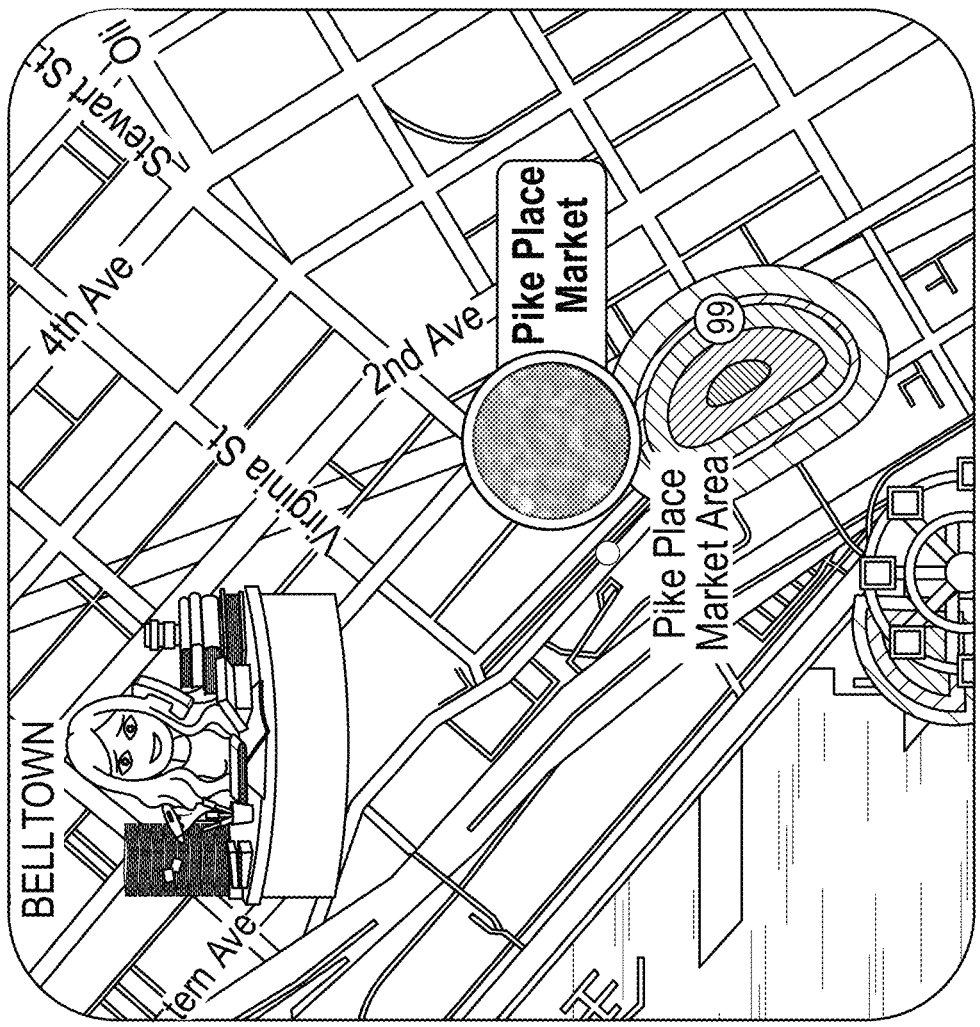
FIG. 11 shows a user interface according to an embodiment.

FIG. 11 shows a user interface according to an embodiment. In the user interface 1100, the system 214 has determined that the sending user locates in a business district (e.g., downtown Seattle) during work hours. The system 214 further determines from the user signal data, such as heart rate data, traffic data, weather data, etc., that the current state of the sending user is working. The user state system 214 may generate an avatar representing the sending user busily working behind a desk. In one embodiment, the avatar may be the element 824 representing the working state, as shown in FIG. 8.

Figure 12:
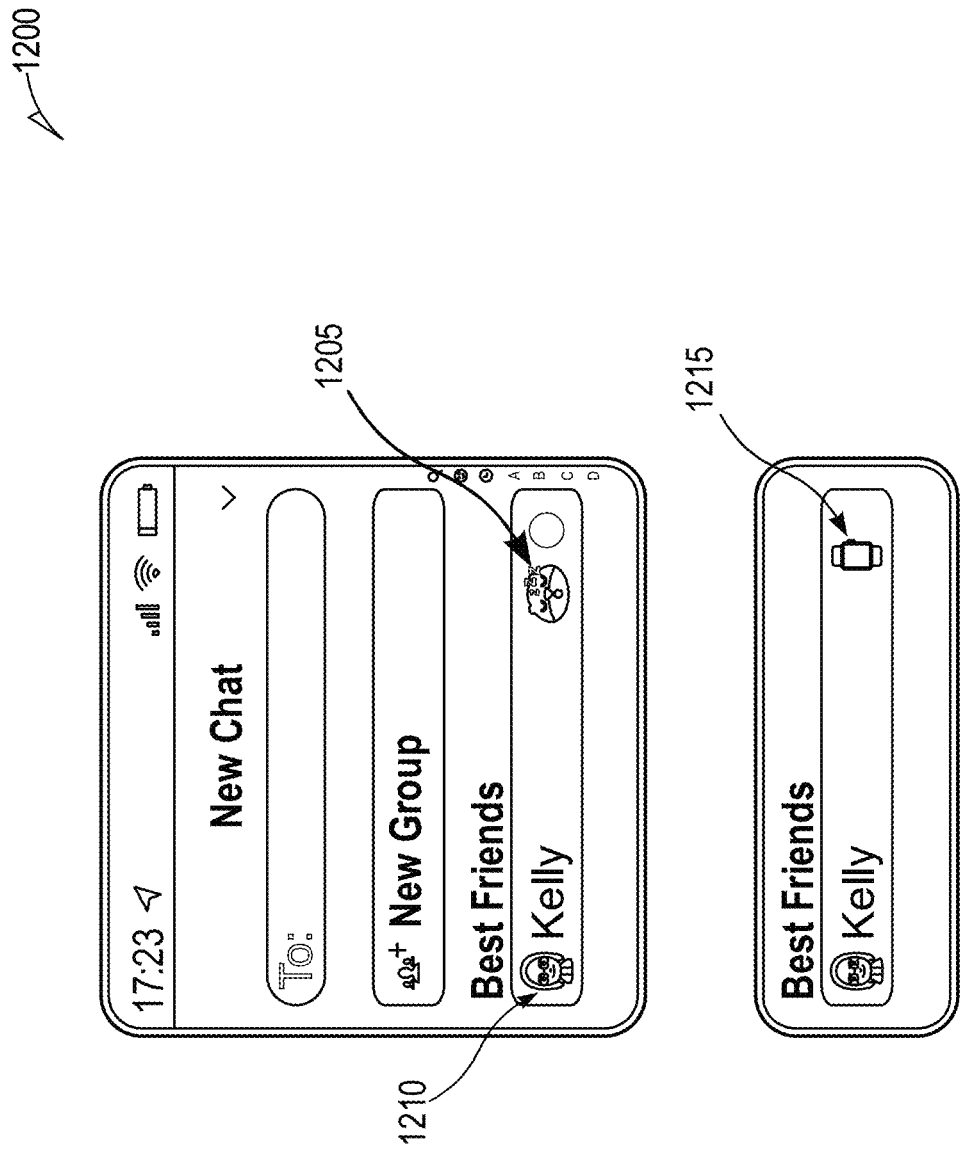
FIG. 12 shows a user interface according to an embodiment.

FIG. 12 shows a user interface according to an embodiment. The user interface 1202 may be displayed on a client device 102. A display item 1205 is shown next to the name of a connected user (e.g., Kelly) and the associated profile avatar 1210 in the user interface 1200. The display item 1205 is updated in real-time by the user state system to reflect the current state of the connected user. In one embodiment, the display item 1205 may be the element 822 associated with sleep state as shown in FIG. 8, that the user state system has determined that the connected user Kelly is currently sleeping, based on her signal data received on her own client device 102. In one embodiment, the processor may instead cause a display of display item 1215 representing a smartwatch instead of the display item 1205 on the user interface 1202. The display item 1215 may indicate the client device 102 for receiving user signal data of the recipient user is a smartwatch.

Figure 13:
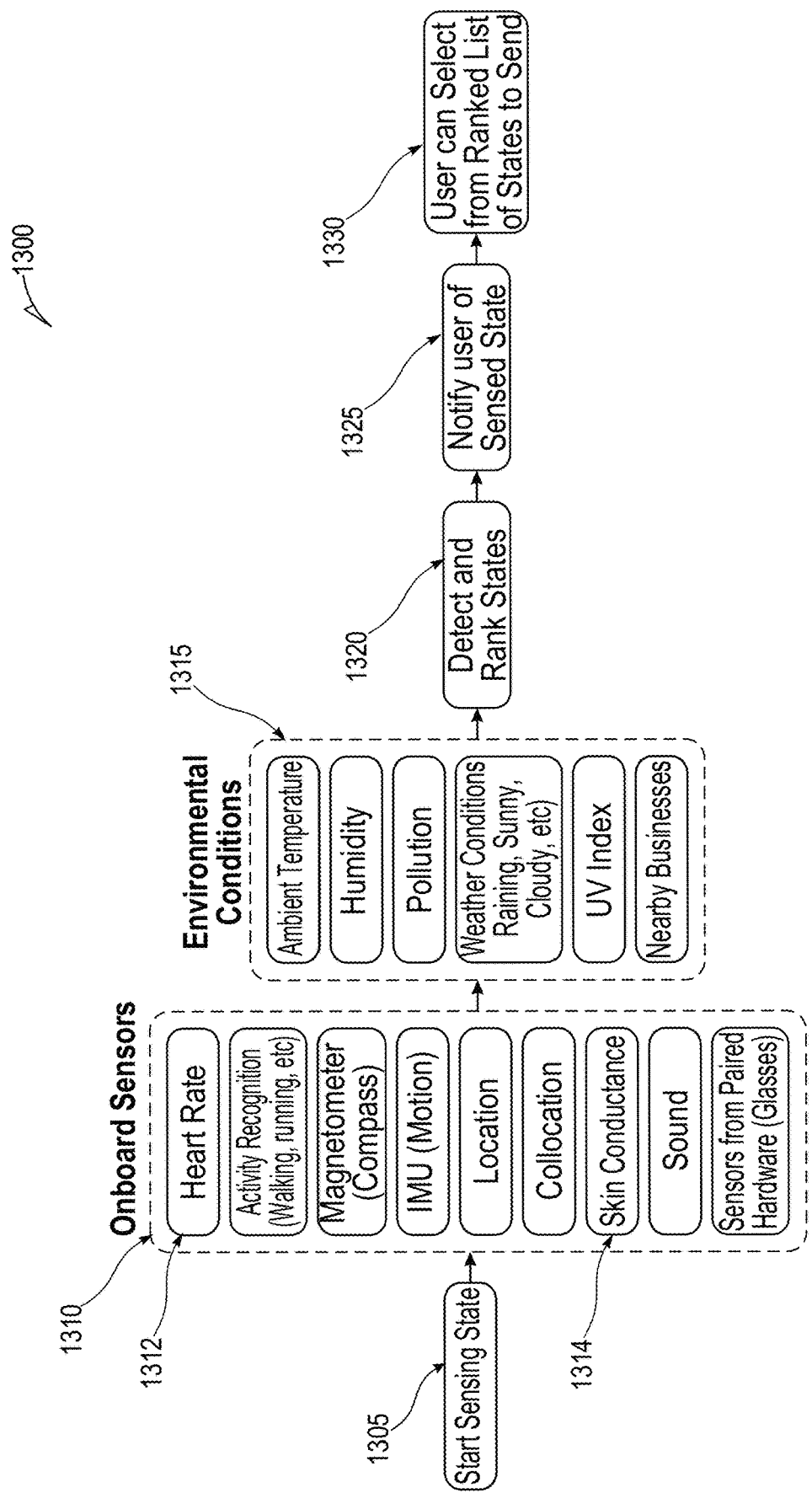
FIG. 13 shows a block diagram of generating a current state according to an embodiment.

FIG. 13 shows a block diagram of generating a current state according to an embodiment. The block diagram 1300 is a process implemented by the user state system 214. The operations of process 1300 may be performed by any number of different systems, such as the messaging server 114 or the messaging client 104 described herein, or any portion thereof, such as a processor included in any of the systems (e.g., the user state system). Specifically, at operation 1305, the processor starts sensing state by receiving user signal data including sensor-based data in block 1310, including biosignal data (e.g., heart rate data 1312 and skin conductance data 1314) and non-sensor based data in block 1315, including environmental conditions data. At operation 1320, the processor detects and ranks states based on total scores assigned to the states. At operation 1325, the processor notifies a user of the sensed or determined current state with the highest total score by causing a display of notifications on the client device 102 of the sending user. At operation 1330, the processor may receive a user selection of a state, either the current state determined by the user state system 214 or another state determined by the user, to be sent to the recipient user.

FIG. 14 shows a block diagram of scores determined for user states according to an embodiment. In one embodiment, the user state system 214 determines a total score assigned to the first signal value and the one or more second signal values associated with each state.

The user state system 214 selects or determines a first state of the plurality of states based on a ranking of total scores of the plurality of states. The first state is associated with the highest score among all other states. For example, the total score of running state is 1.8 that is the highest score among happy, sad, and at home states. Therefore, the user state system 214 may determine running as the current state of the user. In one embodiment, each non-biosignal data corresponding to a second signal value is mapped to each state in the plurality of states, according to a logic system coupled to the user state system. The logic of scores mapping for state determination may be based on general probabilities determined by statistics of all users registered in the messaging server system 108 or may be based on any user data that is available to the messaging server system 108. The scores may also be customized for individual users based on the user's traits and preferences, as discussed in the above context.

Time-Based Access Limitation Architecture

Figure 5:
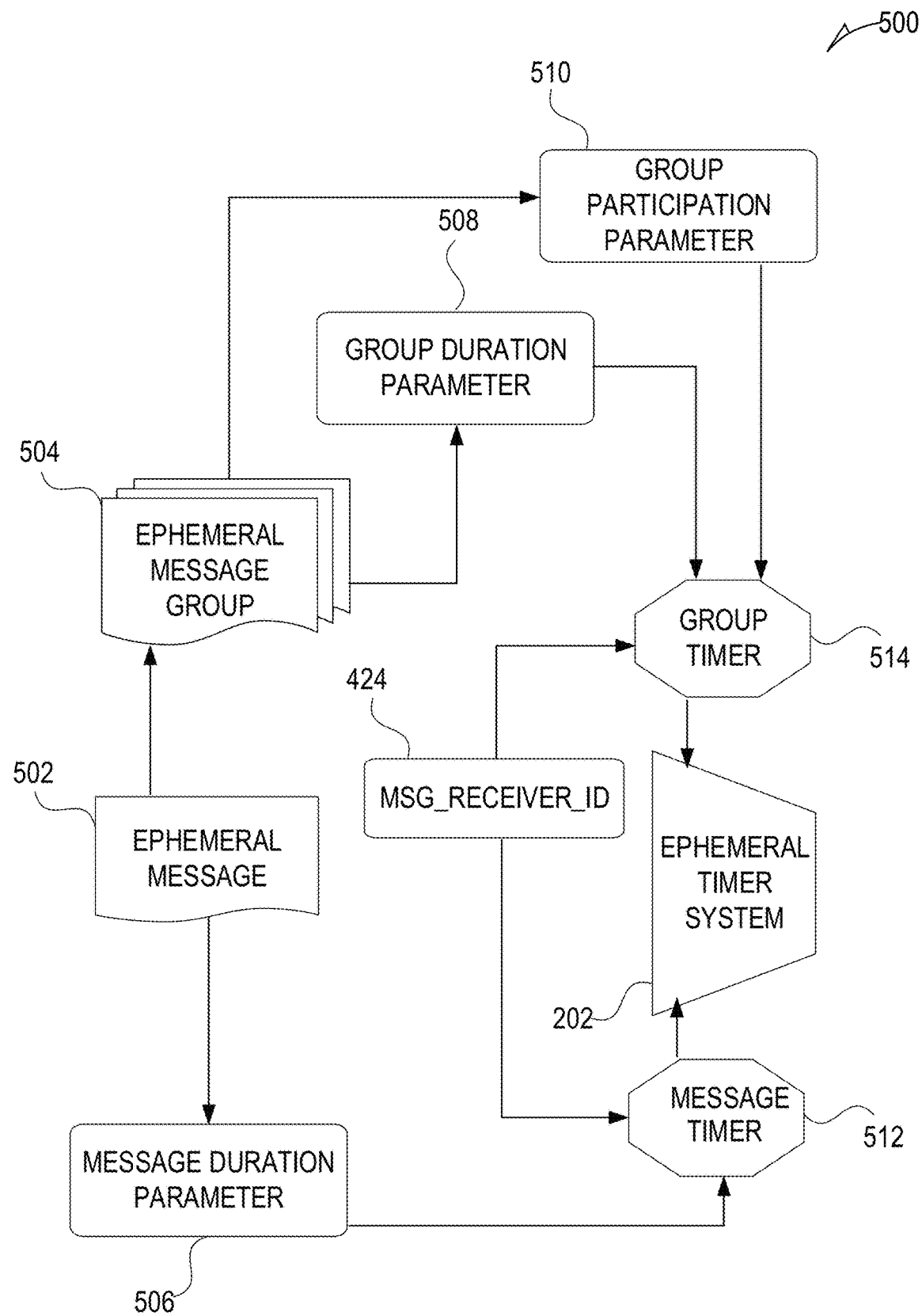
FIG. 5 is a flowchart for an access-limiting process, in accordance with an embodiment.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a recipient user of the ephemeral message 502 by the messaging client 104. In one example, an ephemeral message 502 is viewable by a recipient user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular recipient user identified by the message receiver identifier 424. In particular, the ephemeral message 502 will only be shown to the relevant recipient user for a time period determined by the value of the message duration parameter 506. The message timer 512 is shown to provide output to a more generalized ephemeral timer system 202, which is responsible for the overall timing of display of content (e.g., an ephemeral message 502) to a recipient user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular recipient user and, if so, for how long. Note that the ephemeral message group 504 is also aware of the identity of the particular recipient user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a recipient user, even within the context of the ephemeral message group 504. Accordingly, the message duration parameter 506 determines the duration of time that a particular ephemeral message 502 is displayed to a recipient user, regardless of whether the recipient user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Machine Architecture

Figure 15:
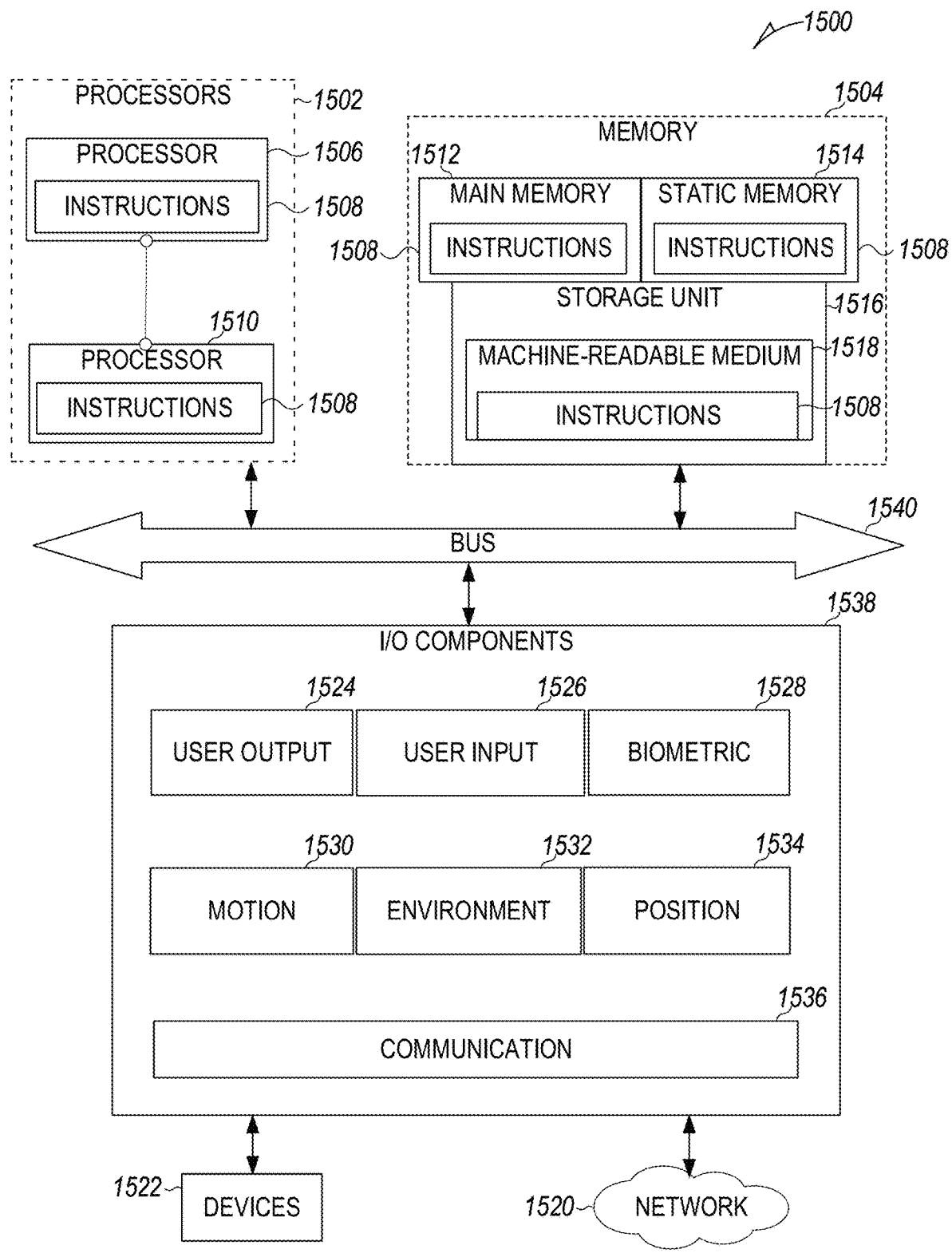
FIG. 15 is a diagrammatic representation of a machine in the form of a computer system within which a set of instructions may be executed for causing the machine to perform any one or more of the methodologies discussed herein, in accordance with an embodiment.

FIG. 15 is a diagrammatic representation of the machine 1500 within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute any one or more of the methods described herein. The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein. The machine 1500, for example, may comprise the client device 102 or any one of a number of server devices forming part of the messaging server system 108. In one embodiment, the machine 1500 may also comprise both client and server systems, with certain operations of a particular method or algorithm being performed on the server-side and with certain operations of the particular method or algorithm being performed on the client-side.

The machine 1500 may include processors 1502, memory 1504, and input/output I/O components 1538, which may be programmed to communicate with each other via a bus 1540. In an example, the processors 1502 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1506 and a processor 1510 that execute the instructions 1508. The term "processor" is intended to include multi-core processors that may comprise two or more independent processors (sometimes referred to as "cores") that may execute instructions contemporaneously. Although FIG. shows multiple processors 1502, the machine 1500 may include a single processor with a single-core, a single processor with multiple cores (e.g., a multi-core processor), multiple processors with a single core, multiple processors with multiples cores, or any combination thereof.

The memory 1504 includes a main memory 1512, a static memory 1514, and a storage unit 1516, both accessible to the processors 1502 via the bus 1540. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors 1502 (e.g., within the Processor's cache memory), or any suitable combination thereof, during execution thereof by the machine 1500.

The I/O components 1538 may include a wide variety of components to receive input, provide output, produce output, transmit information, exchange information, capture measurements, and so on. The specific I/O components 1538 that are included in a particular machine will depend on the type of machine. For example, portable machines such as mobile phones may include a touch input device or other such input mechanisms, while a headless server machine will likely not include such a touch input device. It will be appreciated that the I/O components 1538 may include many other components that are not shown in FIG. 15. In various examples, the I/O components 1538 may include user output components 1524 and user input components 1526. The user output components 1524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1526 may include alphanumeric input components (e.g., a keyboard, a touch screen programmed to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1538 may include biometric components 1528, motion components 1530, environmental components 1532, or position components 1534, among a wide array of other components. For example, the biometric components 1528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1530 include acceleration sensor components (e.g., accelerometer), gravitation sensor components, rotation sensor components (e.g., gyroscope).

The environmental components 1532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1538 further include communication components 1536 operable to couple the machine 1500 to a network 1520 or devices 1522 via respective coupling or connections. For example, the communication components 1536 may include a network interface Component or another suitable device to interface with the network 1520. In further examples, the communication components 1536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1522 may be another machine or any of a wide variety of peripheral devices (e.g., a peripheral device coupled via a USB).

Moreover, the communication components 1536 may detect identifiers or include components operable to detect identifiers. For example, the communication components 1536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1536, such as location via Internet Protocol (IP) geolocation, location via Wi-Fi® signal triangulation, location via detecting an NFC beacon signal that may indicate a particular location, and so forth.

The various memories (e.g., main memory 1512, static memory 1514, and memory of the processors 1502) and storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed embodiments.

The instructions 1508 may be transmitted or received over the network 1520, using a transmission medium, via a network interface device (e.g., a network interface component included in the communication components 1536) and using any one of several well-known transfer protocols (e.g., hypertext transfer protocol (HTTP)). Similarly, the instructions 1508 may be transmitted or received using a transmission medium via a coupling (e.g., a peer-to-peer coupling) to the devices 1522.

Software Architecture

Figure 16:
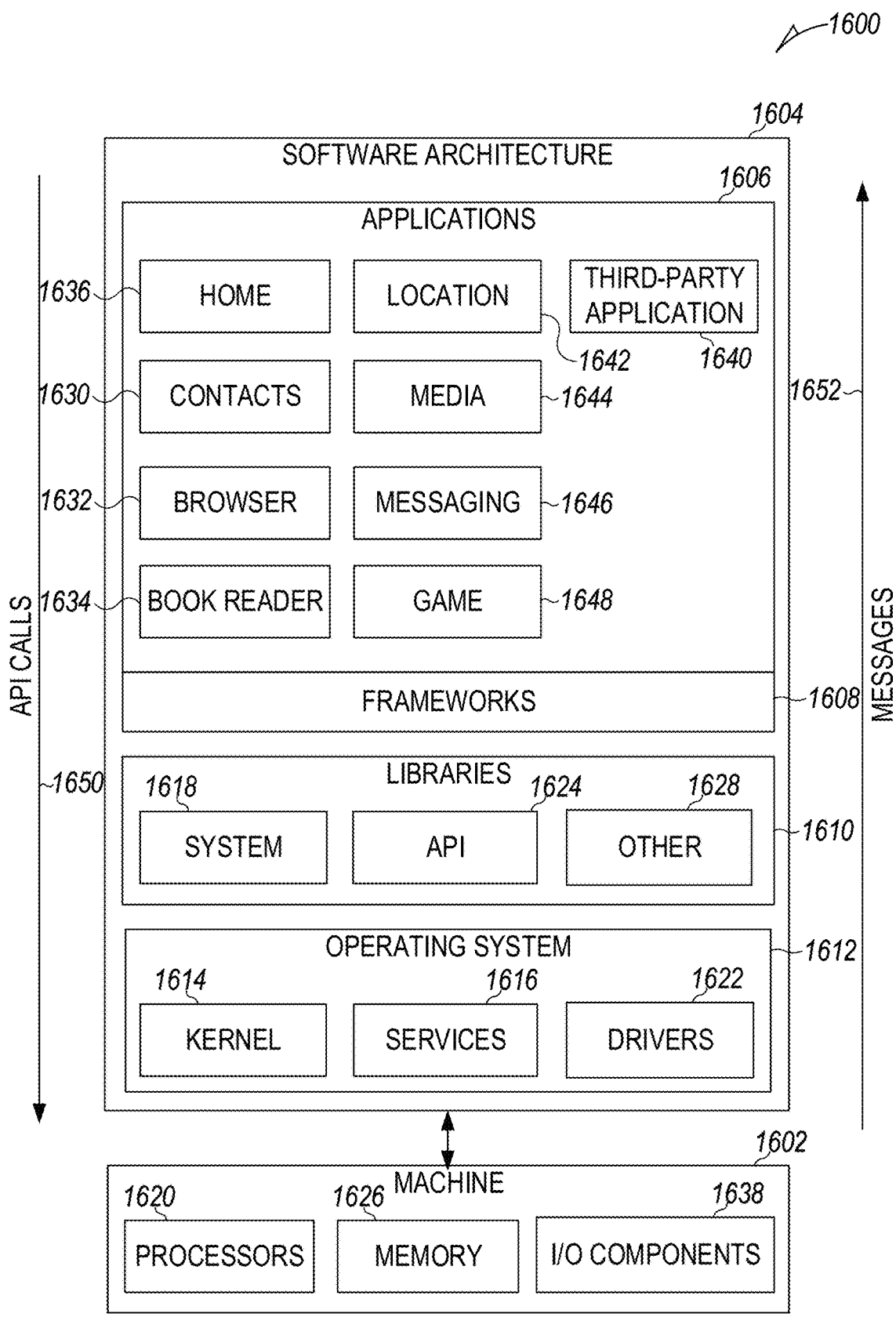
FIG. 16 is a block diagram showing a software architecture within which embodiments may be implemented.

FIG. 16 is a block diagram 1600 illustrating a software architecture 1604, which can be installed on any one or more of the devices described herein. The software architecture 1604 is supported by hardware such as a machine 1602 that includes processors 1620, memory 1626, and I/O components 1638. In this example, the software architecture 1604 can be conceptualized as a stack of layers, where each layer provides a particular functionality. The software architecture 1604 includes layers such as an operating system 1612, libraries 1610, frameworks 1608, and applications 1606. Operationally, the applications 1606 invoke API calls 1650 through the software stack and receive messages 1652 in response to the API calls 1650.

The operating system 1612 manages hardware resources and provides common services. The operating system 1612 includes, for example, a kernel 1614, services 1616, and drivers 1622. The kernel 1614 acts as an abstraction layer between the hardware and the other software layers. For example, the kernel 1614 provides memory management, processor management (e.g., scheduling), component management, networking, and security settings, among other functionality. The services 1616 can provide other common services for the other software layers. The drivers 1622 are responsible for controlling or interfacing with the underlying hardware. For instance, the drivers 1622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1610 provide a common low-level infrastructure used by the applications 1606. The libraries 1610 can include system libraries 1618 (e.g., C standard library) that provide functions such as memory allocation functions, string manipulation functions, mathematic functions, and the like. In addition, the libraries 1610 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1610 can also include a wide variety of other libraries 1628 to provide many other APIs to the applications 1606.

The frameworks 1608 provide a common high-level infrastructure that is used by the applications 1606. For example, the frameworks 1608 provide various graphical user interface (GUI) functions, high-level resource management, and high-level location services. The frameworks 1608 can provide a broad spectrum of other APIs that can be used by the applications 1606, some of which may be specific to a particular operating system or platform.

In an example, the applications 1606 may include a home application 1636, a contacts application 1630, a browser application 1632, a book reader application 1634, a location application 1642, a media application 1644, a messaging application 1646, a game application 1648, and a broad assortment of other applications such as a third-party application 1640. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1640 can invoke the API calls 1650 provided by the operating system 1612 to facilitate functionality described herein.

Processing Components

Figure 17:
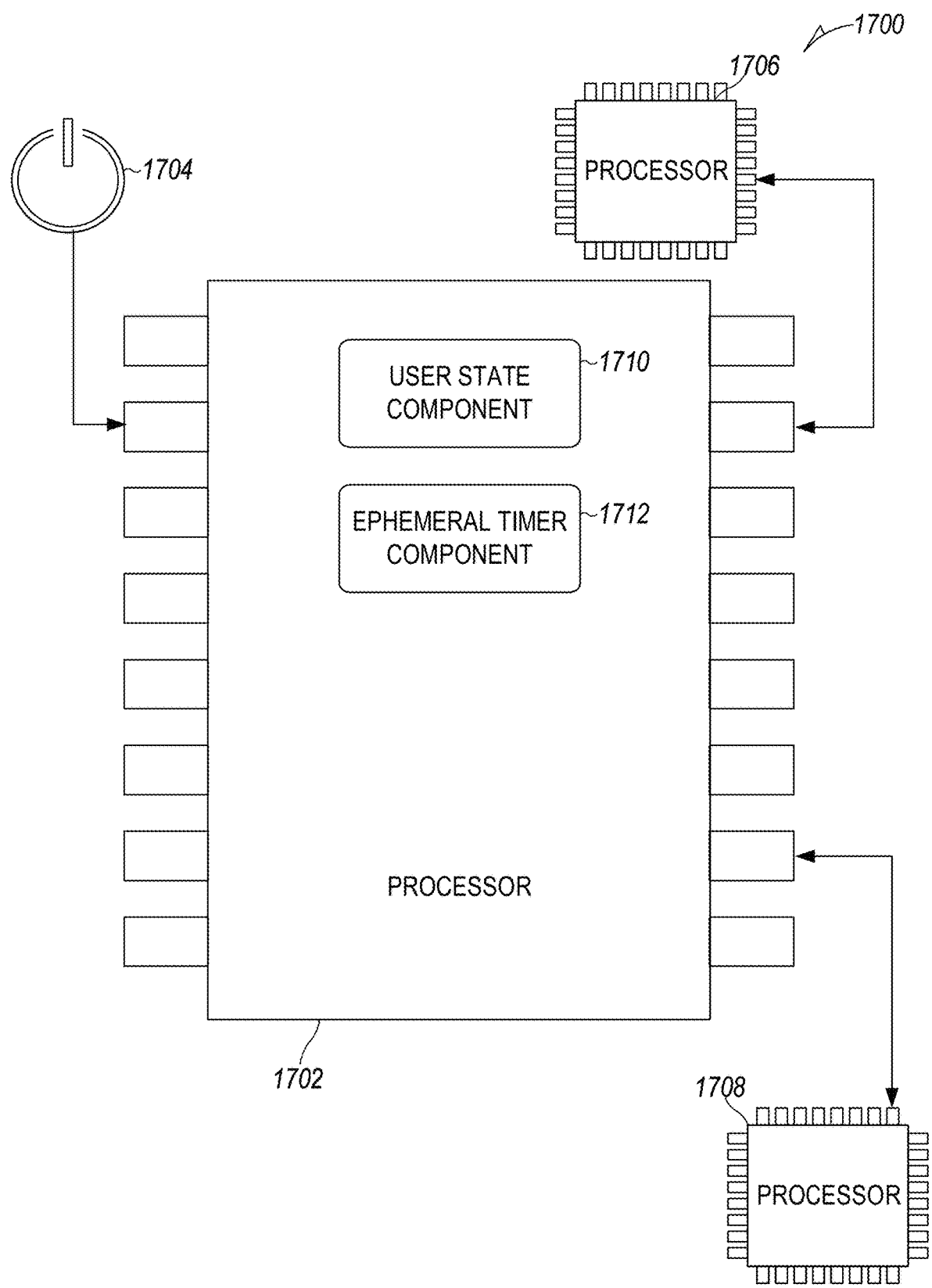
FIG. 17 is a diagrammatic representation of a processing environment according to an embodiment.

Turning now to FIG. 17, there is shown a diagrammatic representation of a processing environment 1700, which includes a processor 1702, a processor 1706, and a processor 1708 (e.g., a GPU, CPU or combination thereof).

The processor 1702 is shown to be coupled to a power source 1704, and to include (either permanently programmed or temporarily instantiated) modules, namely a user state component 1710 and an ephemeral timer component 1712. The user state component 1710 operationally receives user signal data and generates current state of users. The ephemeral timer component 1712 operationally manages the haptic patterns of the notifications corresponding to the states of users, and the time duration of the notifications displayed on the client device 102. As illustrated, the processor 1702 is communicatively coupled to both the processor 1706 and the processor 1708.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be arranged in a certain physical manner. In one embodiment, one or more computer systems (e.g., a standalone computer system, a client computer system, or a server computer system) or one or more hardware components of a computer system (e.g., a processor or a group of processors) may be programmed by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently programmed to perform certain operations. A hardware component may be a special-purpose processor, such as a field-programmable gate array (FPGA) or an application specific integrated circuit (ASIC). A hardware component may also include programmable logic or circuitry that is temporarily programmed by software to perform certain operations. For example, a hardware component may include software executed by a general-purpose processor or other programmable processor. Once programmed by such software, hardware components become specific machines (or specific components of a machine) uniquely tailored to perform the functions and are no longer general-purpose processors. It will be appreciated that the decision to implement a hardware component mechanically, in dedicated and permanently programmed circuitry, or in temporarily programmed circuitry (e.g., programmed by software), may be driven by cost and time considerations. Accordingly, the phrase "hardware component" (or "hardware-implemented component") should be understood to encompass a tangible entity, be that an entity that is physically constructed, permanently hardwired, or temporarily programmed to operate in a certain manner or to perform certain operations described herein. Considering embodiments in which hardware components are temporarily programmed, each of the hardware components need not be programmed or instantiated at any one instance in time. For example, where a hardware component comprises a general-purpose processor programmed by software to become a special-purpose processor, the general-purpose processor may be programmed as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are programmed or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily programmed (e.g., by software) or permanently programmed to perform the relevant operations. Whether temporarily or permanently programmed, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In one embodiment, the processors or processor-implemented components may be located in a single geographic location (e.g., within a home environment, an office environment, or a server farm). In one embodiment, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium,"

"device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   detecting, via a first device, real-time biosignal data and real-time physical activity data;
   determining a presence state of a user associated with the first device based on the real-time biosignal data and real-time physical activity data;
   generating a message based on the presence state of the user;
   determining a time period for a display of the message based on immediacy of the presence state; and
   causing display of the message on a second device, the message being displayed on the second device within the time period.

2. The method of claim 1, wherein the message comprises a media content item that represents the presence state of the user.

3. The method of claim 2, comprising:
   receiving an indication of user selection of the message via the second device; and
   causing display of a media content item that represents the presence state of the user.

4. The method of claim 1, comprising:
   generating a plurality of selectable user interface elements, each selectable user interface element corresponding to a media content item that represents a reaction to the presence state of the user; and
   causing display of the plurality of selectable user interface elements on the second device.

5. The method of claim 4, comprising:
   detecting, via the second device, an indication of user selection of a selectable user interface element from the plurality of selectable user interface elements; and
   identifying a media content item that corresponds to the selectable user interface element; and
   causing display of the media content item on the first device.

6. The method of claim 1, comprising:
   determining a haptic pattern of the message based on a type of the presence state; and
   causing display of the message on the second device, the causing display of the message including causing the second device to vibrate based on the determined haptic pattern.

7. The method of claim 1, wherein the user is a first user, comprising:
   detecting, via the second device, real-time biosignal data and real-time physical activity data of a second user associated with the second device; and
   determining a presence state of the second user based on the real-time biosignal data and the real-time physical activity data of the second user.

8. The method of claim 7, comprising:
   identifying a physical activity associated with the presence state of the second user;
   delaying the causing display of the message on the second device until a further presence state of the second user is determined, the further presence state of the second user not being associated with the physical activity.

9. The method of claim 1, wherein the message comprises a video that represents the presence state of the user.

10. The method of claim 9, wherein the video is caused to be displayed with a background color that is determined based on a type of the presence state of the user.

11. A system comprising:
    one or more hardware processors; and
    a non-transitory machine-readable medium for storing instructions that, when executed by the one or more hardware processors, cause the one or more hardware processors to perform operations comprising:
    detecting, via a first device, real-time biosignal data and real-time physical activity data;
    determining a presence state of a user associated with the first device based on the real-time biosignal data and real-time physical activity data;
    generating a message based on the presence state of the user;
    determining a time period for a display of the message based on immediacy of the presence state; and
    causing display of the message on a second device, the message being displayed on the second device within the time period.

12. The system of claim 11, wherein the message comprises a media content item that represents the presence state of the user.

13. The system of claim 12, wherein the operations comprise:
    receiving an indication of user selection of the message via the second device; and
    causing display of a media content item that represents the presence state of the user.

14. The system of claim 11, wherein the operations comprise:
    generating a plurality of selectable user interface elements, each selectable user interface element corresponding to a media content item that represents a reaction to the presence state of the user; and
    causing display of the plurality of selectable user interface elements on the second device.

15. The system of claim 14, wherein the operations comprise:
    detecting, via the second device, an indication of user selection of a selectable user interface element from the plurality of selectable user interface elements; and
    identifying a media content item that corresponds to the selectable user interface element; and
    causing display of the media content item on the first device.

16. The system of claim 11, wherein the operations comprise:

determining a haptic pattern of the message based on a type of the presence state; and causing display of the message on the second device, the causing display of the message including causing the second device to vibrate based on the determined haptic pattern.

17. The system of claim 11, wherein the user is a first user, and wherein the operations comprise:
   detecting, via the second device, real-time biosignal data and real-time physical activity data of a second user associated with the second device; and
   determining a presence state of the second user based on the real-time biosignal data and the real-time physical activity data of the second user.

18. The system of claim 17, wherein the operations comprise:
   identifying a physical activity associated with the presence state of the second user;
   delaying the causing display of the message on the second device until a further presence state of the second user is determined, the further presence state of the second user not being associated with the physical activity.

19. The system of claim 11, wherein the message comprises a video that represents the presence state of the user, and wherein the video is caused to be displayed with a background color that is determined based on a type of the presence state of the user.

20. A non-transitory machine-readable medium for storing instructions that, when executed by one or more hardware processors, cause the one or more hardware processors to perform operations comprising:
   detecting, via a first device, real-time biosignal data and real-time physical activity data;
   determining a presence state of a user associated with the first device based on the real-time biosignal data and real-time physical activity data;
   generating a message based on the presence state of the user;
   determining a time period for a display of the message based on immediacy of the presence state; and
   causing display of the message on a second device, the message being displayed on the second device within the time period.

\* \* \* \* \*